(12) United States Patent
Munkes et al.

(10) Patent No.: US 8,996,552 B2
(45) Date of Patent: Mar. 31, 2015

(54) SYSTEM AND METHOD FOR GRAPHICALLY CREATING QUERIES ON MODEL DATA

(71) Applicant: Software AG, Darmstadt (DE)

(72) Inventors: Ralf Werner Munkes, Woelfling-lès-Sarreguemines (FR); Stefan Ruschel, Schmelz (DE); Markus Werner, Zweibrücken (DE)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 13/684,400

(22) Filed: Nov. 23, 2012

(65) Prior Publication Data
US 2014/0129583 A1 May 8, 2014

(30) Foreign Application Priority Data
Nov. 5, 2012 (EP) .................................. 12191218

(51) Int. Cl.
 *G06F 17/30* (2006.01)
(52) U.S. Cl.
 CPC .... *G06F 17/30967* (2013.01); *G06F 17/30398* (2013.01); *G06F 17/30545* (2013.01)
 USPC .......................................................... 707/760
(58) Field of Classification Search
 CPC ................... G06F 17/30103; G06F 17/30277; G06F 17/30404; G06F 17/30427; G06F 17/30976; G06F 17/30107; G06F 17/3043; G06F 17/30436; G06F 17/3064; G06F 17/30637; G06F 17/30646; G06F 17/3066; G06F 17/30669; G06F 17/30914; G06F 17/30917; G06F 17/3097
 USPC ......... 707/721, 739, 757, 760, 763, 765, 766, 707/767, 768, 773, E17.07, E17.062, 707/E17.066, E17.068, E17.073, E17.128, 707/E17.137, E17.139
 See application file for complete search history.

(56) References Cited

U.S. PATENT DOCUMENTS

| | | | |
|---|---|---|---|
| 5,721,900 A | 2/1998 | Banning et al. | |
| 6,233,584 B1 | 5/2001 | Purcell | |
| 6,609,123 B1 | 8/2003 | Cazemier et al. | |
| 6,704,726 B1 * | 3/2004 | Amouroux | 1/1 |
| 7,383,255 B2 * | 6/2008 | Desai et al. | 707/763 |
| 7,383,513 B2 | 6/2008 | Goldberg et al. | |
| 7,693,900 B2 * | 4/2010 | Wilmering et al. | 707/713 |

(Continued)

OTHER PUBLICATIONS

Yuan et al., "A Semantic Information Integration Tool Suite", Proceedings of the 32nd international conference on Very large data bases (VLDB '06), Sep. 12-15, 2006, Seoul Korea, pp. 1171-1174.

(Continued)

*Primary Examiner* — Jean M Corrielus
(74) *Attorney, Agent, or Firm* — Nixon & Vanderhye PC

(57) ABSTRACT

Certain example embodiments relate to techniques for creating queries on model data of at least one data source ($DS_1, \ldots, DS_3$) in accordance with at least one data source specific format. A graphical query builder (QB) is configured to enable a user to graphically define a query including multiple building blocks in accordance with a data source independent format (MM). At least one adapter ($A_1, \ldots, A_3$) for the at least one data source ($DS_1, \ldots, DS_3$) is configured to translate the query in the data source independent format (MM) into at least one corresponding query in the data source specific format.

21 Claims, 16 Drawing Sheets

(56) References Cited

U.S. PATENT DOCUMENTS

Figure 1:
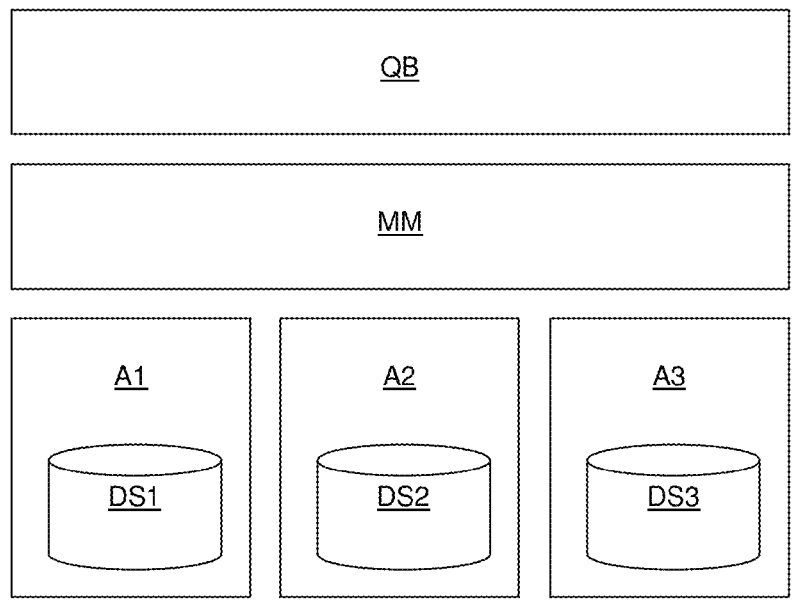

| | | | |
|---|---|---|---|
| 7,792,817 B2* | 9/2010 | Shan et al. | 707/709 |
| 7,853,618 B2 | 12/2010 | Yuan et al. | |
| 8,504,568 B2* | 8/2013 | Chandrasekhara et al. | 707/737 |
| 8,533,660 B2* | 9/2013 | Mehr et al. | 717/104 |
| 8,543,973 B2* | 9/2013 | Nguyen et al. | 717/106 |
| 8,694,532 B2* | 4/2014 | Freire | 707/769 |
| 8,874,551 B2* | 10/2014 | Rosjat et al. | 707/722 |
| 2005/0120027 A1* | 6/2005 | Ter Horst | 707/100 |
| 2006/0047648 A1* | 3/2006 | Martin | 707/4 |
| 2006/0080313 A1* | 4/2006 | Freire | 707/5 |
| 2008/0077598 A1* | 3/2008 | Wilmering et al. | 707/100 |
| 2009/0132562 A1* | 5/2009 | Mehr et al. | 707/100 |
| 2011/0258173 A1* | 10/2011 | Ratiner et al. | 707/706 |
| 2011/0282892 A1* | 11/2011 | Castellani et al. | 707/766 |
| 2012/0110652 A1* | 5/2012 | Brown et al. | 726/7 |
| 2012/0173615 A1* | 7/2012 | Greer et al. | 709/203 |
| 2012/0323941 A1* | 12/2012 | Chkodrov et al. | 707/756 |
| 2013/0304724 A1* | 11/2013 | Rosjat et al. | 707/722 |

OTHER PUBLICATIONS

Jones, Steve, Department of Computer Science, University of Waikato, Hamilton, New Zealand: "Graphical Query Specification and Dynamic Result Previews for a Digital Library", UIST '98 Proceedings of the 11th annual ACM symposium on User interface software and technology, pp. 143-151.

Fellman et al., Institut für Informationsmanagement and Unternehmensführung, Universität Osnabrück: "Process Model Verification with SemQuu", In Proceedings of EMISA Sep. 22-23, 2011, pp. 231-236, http://subs.emis.de/LNI/Proceedings/Proceedings190/231.pdf.

Article: "Graphical Query Builder", http://www.pgadmin.org/docs/dev/gqb.html, Developer documentation of PostgreSQL tools, retrieved Nov. 23, 2012, pp. 2 of 2.

Signavio: http://www.signavio.com/en/products/overview.html, retrieved Nov. 23, 2012, pp. 3 of 3.

BOC Group, Adonis: http://www.boc-group.com/de/info-center/news/artikel/article/software-adonis-fuer-die-geschaeftsprozessmodellie/, retrieved Nov. 23, 2012, pp. 1 of 1.

Mega: http://www.mega.com/en/c/product/p/modeling, retrieved Nov. 23, 2012, pp. 1 of 1.

Casewise: http://cw-innovations.de/, retrieved Nov. 23, 2012, pp. 6 of 6.

Cogniscape: CogniViz as graphical query Builder, which has also a special implementation for ARIS (http://cogniscape.corn/demo/CVatPW08,swf), retrieved Nov. 23, 2012, pp. 1 and 2. http://www.cogniscape.com.

Metastorm / Open Text: http://www.metastorm.com/products/business_process_analysis.asp, retrieved Nov. 23, 2012, pp. 2 of 2.

SAP BEx Query Designer: http://www.slideshare.net/darrencrowder/sap-net-weaver-bpm-process-management-72-process-analytics-3549468, retrieved Nov. 23, 2012, pp. 12 (total) http://help.sap.com/saphelp_nw04/helpdata/de/fl/0a569ae09411d2acb90000e829fbfe/content.htm.

Video zum BEx Query Designer: http://www.youtube.com/watch?v=zC0fJzDdNE0, retrieved Nov. 23, 2012, pp. 2 of 2.

IBM Cognos: http://www-01.ibm.com/software/de/data/cognos/, retrieved Nov. 23, 2012, pp. 3 of 3.

(Hyperion) Oracle: Oracle BI Publisher: http://docs.oracle.com/cd/E12096_01/books/PubUser/T421739T423025.htm, retrieved Nov. 23, 2012, pp. 25 (total).

Oracle BI Foundation Suite: http://www.oracle.com/us/solutions/ent-performance-bi/business-intelligence/bi-foundation-suite-170437.html, retrieved Nov. 23, 2012, pp. 1 of 1.

BOC Group, Adonis: http://www.boc-group.com/de/info-center/news/artikel/article/software-adonis-fuer-die-geschaeftsprozessmodellie/, Oct. 10, 2010.

Yuan et al. "A Semantic Information Integration Tool Suite" Mathematics & Computing Technology, Boeing Phantom Works, pp. 1171-1174 (Sep. 12, 2006).

* cited by examiner

SYSTEM AND METHOD FOR GRAPHICALLY CREATING QUERIES ON MODEL DATA

This application claims priority to European Application No. 12 191 218.2 filed Nov. 5, 2012, the entire contents of which are hereby incorporated by reference.

1. TECHNICAL FIELD

Certain example embodiments relate to a system and corresponding method for graphically creating queries on model data.

2. BACKGROUND AND SUMMARY

Complex computer programs are nowadays typically developed using model-driven engineering. That is, instead of directly writing the software code, graphical models are created, from which the actual code may then be automatically or semi-automatically generated. Model-driven engineering is not only used for the development of software, but is also applied for the development and manufacturing of complex technical products, such as automobiles or other machinery. Further, not only products but also processes can be defined using models, and software applications can be used which then control the proper execution of the process steps in accordance with the model. This applies to the development, design and execution of processes such as the sequence of steps to be executed on an assembly belt, or even a business process that defines a certain sequence of tasks to be executed by software components and/or personnel to accomplish an overall complex task.

Generally, a graphical model comprises objects and relations therebetween in accordance with a predefined format and for a given purpose. A given object may occur in different models, e.g. an object representing a certain software component may occur both in a structural diagram (to define its interfaces to other components) and in a flow chart (to define its interaction with other components). Accordingly, a model may be generally understood as a particular "view" on an underlying object net.

With the increasing complexity of such models, it is desired to execute queries on the modelled object net in order to analyse the modelled subject-matter. For example, one might ask "which other components must have finished their processing in order for my component to function properly?".

Apparently, such a query involves relationships between multiple objects, which might be scattered across various different models. More importantly, such relationships might not be modelled explicitly, but oftentimes can only be implicitly derived from the various models. Moreover, complex subject-matter is typically modelled using a variety of different modelling languages, so that a given object might be represented completely differently in different models. For these reasons, querying a complex object net is a very difficult and complex task.

In the prior art, a number of approaches have been proposed to query graphical models. In the field of business process modelling, various Business Process Management (BPM) products are known which allow the modelling of business processes and which control their execution. Examples of such BPM solutions are Signavio, BOC Group Adonis, Mega, and Casewise. To analyse such business models, conventional BPM products typically provide scripting languages or SQL (Structured Query Language) interfaces for formulating queries. However, a drawback of these approaches is that the user has to formulate queries in a complex and difficult to learn scripting language. Also, in order to formulate meaningful queries, the user has to have an in-depth knowledge of the model to be analysed.

Some conventional approaches propose graphical query builders that attempt to assist the user in that queries can be formulated graphically. An example is the Graphical Query Builder (GQB) included in the PostgreSQL tools (cf. http://www.pgadmin.org/docs/dev/gqb.html), which is a typical example of a graphical SQL query builder. Another example is described in "Graphical Query Specification and Dynamic Result previews for a Digital Library" of S. Jones (UIST'98 Proceedings of the $11^{th}$ annual ACM symposium on User interface software and technology, pages 143-151, ACM New York, N.Y., USA, 1998, ISBN: 1-58113-034-1). U.S. Pat. No. 7,383,513 described a similar approach. However, also in these approaches the user has to exactly know the underlying database structure. Further, the above cited graphical query builder can only be used for querying data sources which offer an SQL interface. Lastly, a further drawback is that if the structure of the underlying SQL database changes, all queries defined thus far might not work anymore. Further examples of graphical query builders based on BPM are Cogniscape, Metastorm/OpenText, SAP BEx Query Designer, IBM Cognos, Oracle Hyperion, and Oracle BI Foundation Suite.

U.S. Pat. No. 6,609,123 describes a system to graphically design queries on one or more data sources by building a common meta model above the meta model of the different data sources. The patent teaches to export the so-called meta model of the data source(s), transform them and import them to a own repository. Queries can then be created on this repository. However, each time the meta model of a data source changes, the export and import procedure has to be repeated, which is particularly disadvantageous when dealing with highly dynamic models which change at a rapid pace.

Further, formal approaches are known to perform so-called "model checking" using specific languages. An example is SemQuu (cf. "Process Model Verification with SemQuu" of M. Feldmann et al., available at http://subs.emis.de/LNI/Proceedings/Proceedings190/231.pdf), which can be used to assess the formal correctness of models.

In summary, a common drawback of the conventional techniques—irrespective of whether the queries are defined graphically or not—is that the query creator still needs an in-depth knowledge of the structure and semantics of the underlying models to be queried, which makes the query formulation a difficult and in part even impossible task. Further, the above explained products are mostly designed for a particular type of modelling technique, which makes it difficult or even impossible to perform meaningful analyses on subject-matter modelled by different heterogeneous modelling techniques.

It is therefore the technical problem underlying certain example embodiments to enable the creation of queries executable on models which does not require in-depth knowledge of the underlying data structures, thereby facilitating the formulation of correct and meaningful queries and thereby at least partly overcoming the above explained disadvantages of the prior art.

This problem is according to one aspect of certain example embodiments solved by a system for creating queries on model data of at least one data source in accordance with at least one data source specific format. In the embodiment of claim 1, the system comprises:

a. a graphical query builder, configured for enabling a user to graphically define a query comprising a plurality of building blocks in accordance with a data source independent format; and b. at least one adapter for the at least one data source, configured for translating the query in the data source independent format into at least one corresponding query in the data source specific format.

Accordingly, the embodiment generally relates to the graphical creation of queries on model data, wherein such model data is present in at least one data source, such as a file system, a database, or even retrievable "on the fly" from a software application producing such data (in the sense of streaming data). The model data adheres to a data source specific format, i.e. to a format that is specific to the corresponding data source. The model data may represent graphical model data, such as class diagrams in UML (Unified Modelling Language) notation, which adhere to the UML meta model, or "Event-driven process chain" (EPC) diagrams, which adhere to the meta model defined by the ARIS product of applicant. Further, model data may also comprise non-graphical model data, such as data of an SAP system. Accordingly, a user wanting to formulate a query on such a data source specific model data would normally need a comprehensive knowledge not only of the meaning and semantics of the respective modelling language, but also of the specific format and contents of the model(s) to be queried.

The above embodiment solves this problem in that it provides a graphical query builder to the user, which enables the user to graphically define queries in accordance with a data source independent format. In other words, the user can graphically assemble building blocks for the desired query, wherein the building blocks are independent of the particular format of the underlying data source to be queried. The data source independent format (which is common to all data sources in case there is more than one data source) can be understood as a single meta model that is common to all underlying data sources. This way, the formulation of queries is facilitated to a great extent.

In order to process a query formulated in the data source independent format, certain example embodiments further provide adapter(s) for the respective data source(s) to be queried, which are configured for translating the query in the data source independent format into at least one corresponding query in the data source specific format.

In one aspect of certain example embodiments, the graphical query builder is further configured for enabling the user to select one or more building blocks for defining the query in the data source independent format, wherein each building block represents a query object or a query relation. Accordingly, the query in the data source independent format can be understood preferably as a graph, most preferably as a directed graph. As will be appreciated by the person skilled in the art, a graph structure generally consists of nodes and edges connecting the nodes. Since the building blocks in the data source independent format are preferably either query objects or query relations, the task of formulating a query is particularly easy for the user. Moreover, the user does not have to have any knowledge of the format of the data source specific format of the respective data source to be queried, but only has to connect data source independent objects and relations in order to formulate queries. Preferably, a query relation can be a relation between two query objects, a filter relation and/or a user-defined relation, as will be explained in more detail further below.

In another aspect of certain example embodiments, the system further comprises a first adapter for a first data source and a second adapter for a second data source, the first and second data sources being heterogeneous, wherein each of the first and second adapters is configured for translating at least a part of the same query in the data source independent format into a corresponding partial query in the respective data source specific format.

Accordingly, also an object net whose elements are distributed among multiple data sources can be queried by one single data source independent query. This is achieved in that a suitable adapter is provided for each data source, which translated the relevant parts of the single data source independent query into one or more queries in the format required by the respective data source. In this context, two data sources are understood as heterogeneous if they adhere to different formats, i.e. meta models (such as the above-mentioned ARIS EPC and UML models).

The system may be configured for combining the results of the partial queries in order to generate a single result for the query in the data source independent format.

Preferably, the graphical query builder is configured for enabling the user to graphically define queries in an iterative manner. As will be further explained in the detailed description, once a user has selected a certain query object (corresponding to a node in the query graph), the system may present all possible query relations that are connectable to the selected query object to the user. Upon selection of one of the query relations, the system may provide the user with all query objects that are connectable thereto, and so on. Accordingly, the user is enabled to formulate arbitrarily complex graphical queries in a step-wise manner without having to know the format of the underlying data source(s) to be queried.

In yet another aspect, the at least one adapter is a web service, preferably a RESTful web service. The web services are preferably configured for communicating with the graphical query builder using HTTP. Realizing the adapter(s) as RESTful web service(s) is a particularly preferred implementation of certain example embodiments, which is highly flexible and scalable, as will be explained in more detail further below.

Preferably, each adapter implements a common API (application programming interface) for providing access to the model data in the respective data source. Accordingly, the graphical query builder may communicate with the one or more adapters only via the common API. This way, additional adapters can be flexibly added to the overall system in order to adapt the system to new types of data sources.

The system may be further configured for storing the query in the data source independent format on a storage medium, and for using stored queries for graphically defining one or more further queries. This way, it is possible for a user to define particularly complex queries based on sub-queries that were created previously.

In yet another aspect of certain example embodiments, the at least one adapter is configured for accessing the at least one data source in accordance with an authorization and/or authentication mechanism. Accordingly, it is ensured that a user can only query model data for which the user is allowed, thereby ensuring the security and confidentiality of the model data.

Certain example embodiments also provide a method for creating queries on model data of at least one data source in accordance with at least one data source specific format. In one embodiment, the method comprises the step of graphically defining a query with a graphical query builder, the query comprising a plurality of building blocks in accordance with a data source independent format, and the step of translating, by at least one adapter for the at least one data source, the query in the data source independent format into at least one corresponding query in the data source specific format.

Further advantageous modifications of embodiments of the method of the invention are defined in further dependent claims.

Lastly, certain example embodiments also concern a computer program comprising instructions for implementing any of the above-explained methods, and non-transitory computer readable storage media tangibly storing such programs.

3. SHORT DESCRIPTION OF THE DRAWINGS

Figure 2:
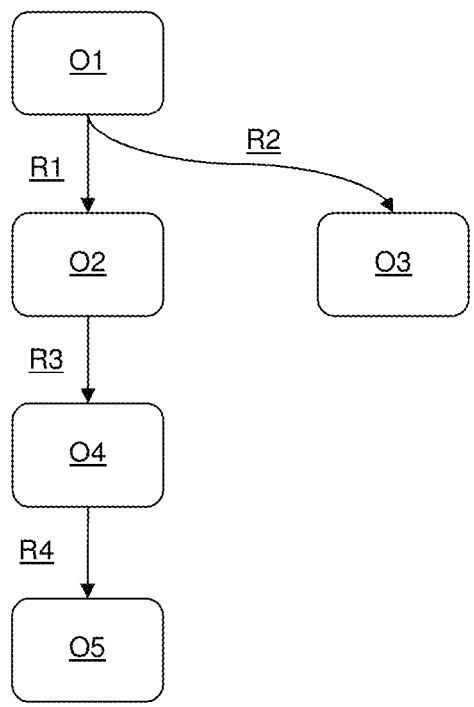
Figure 3A:
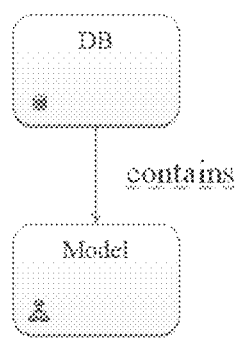
Figure 3B:
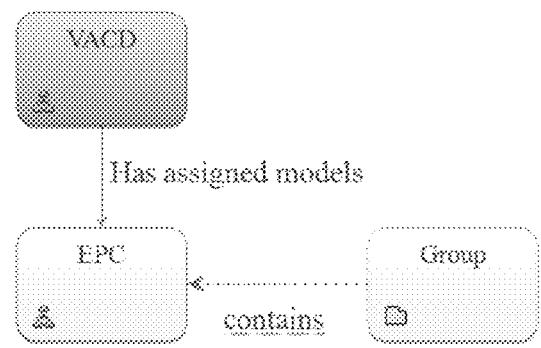
Figure 3C:
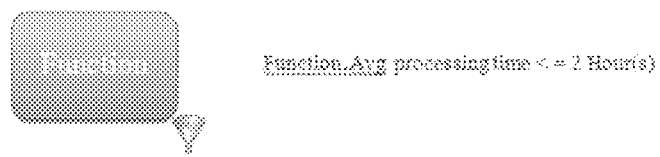
Figure 3D:
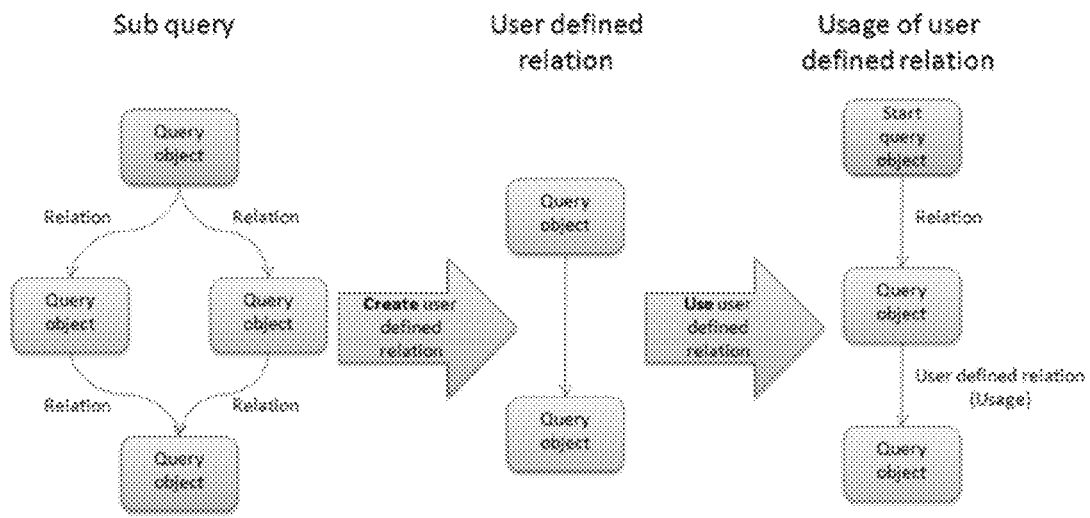
Figure 4A:
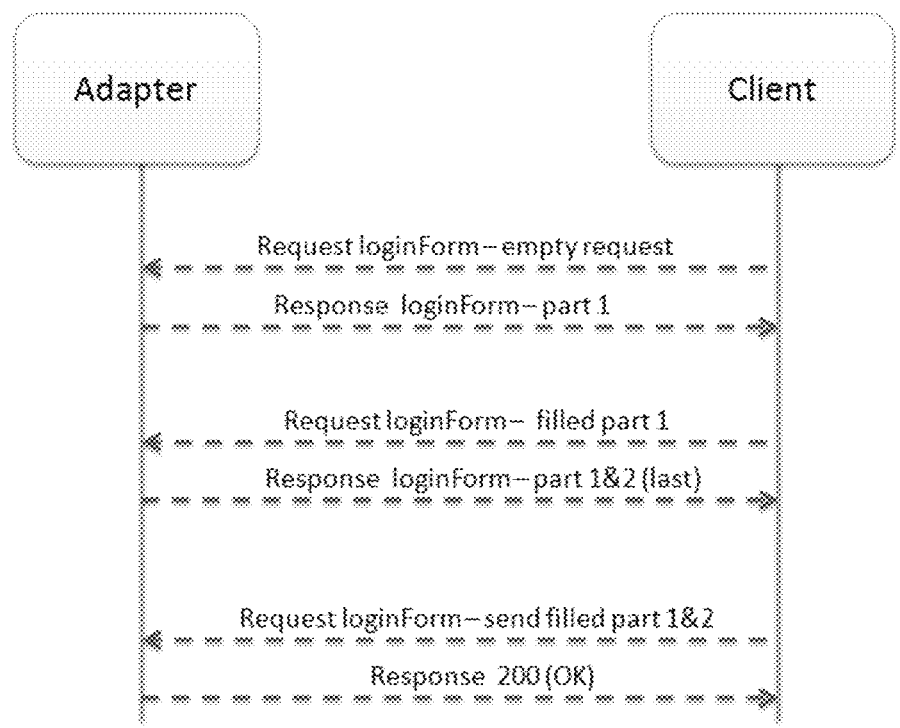
Figure 5:
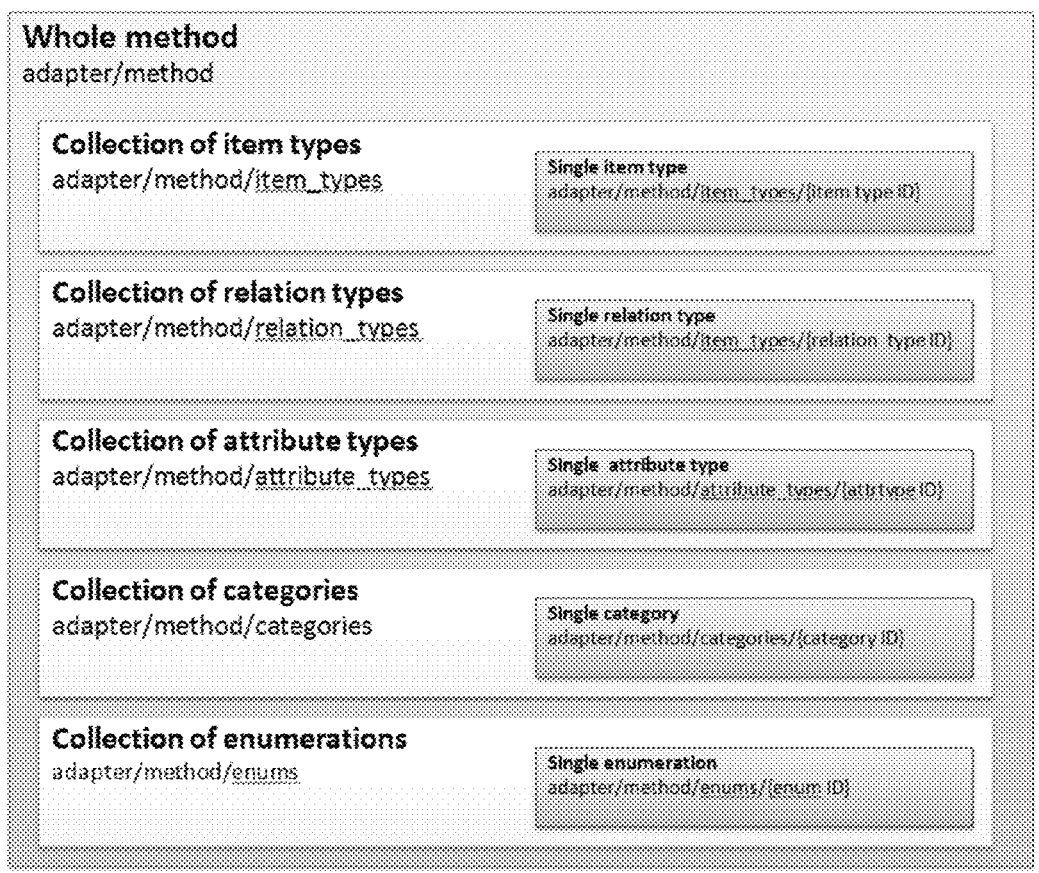
Figure 6:
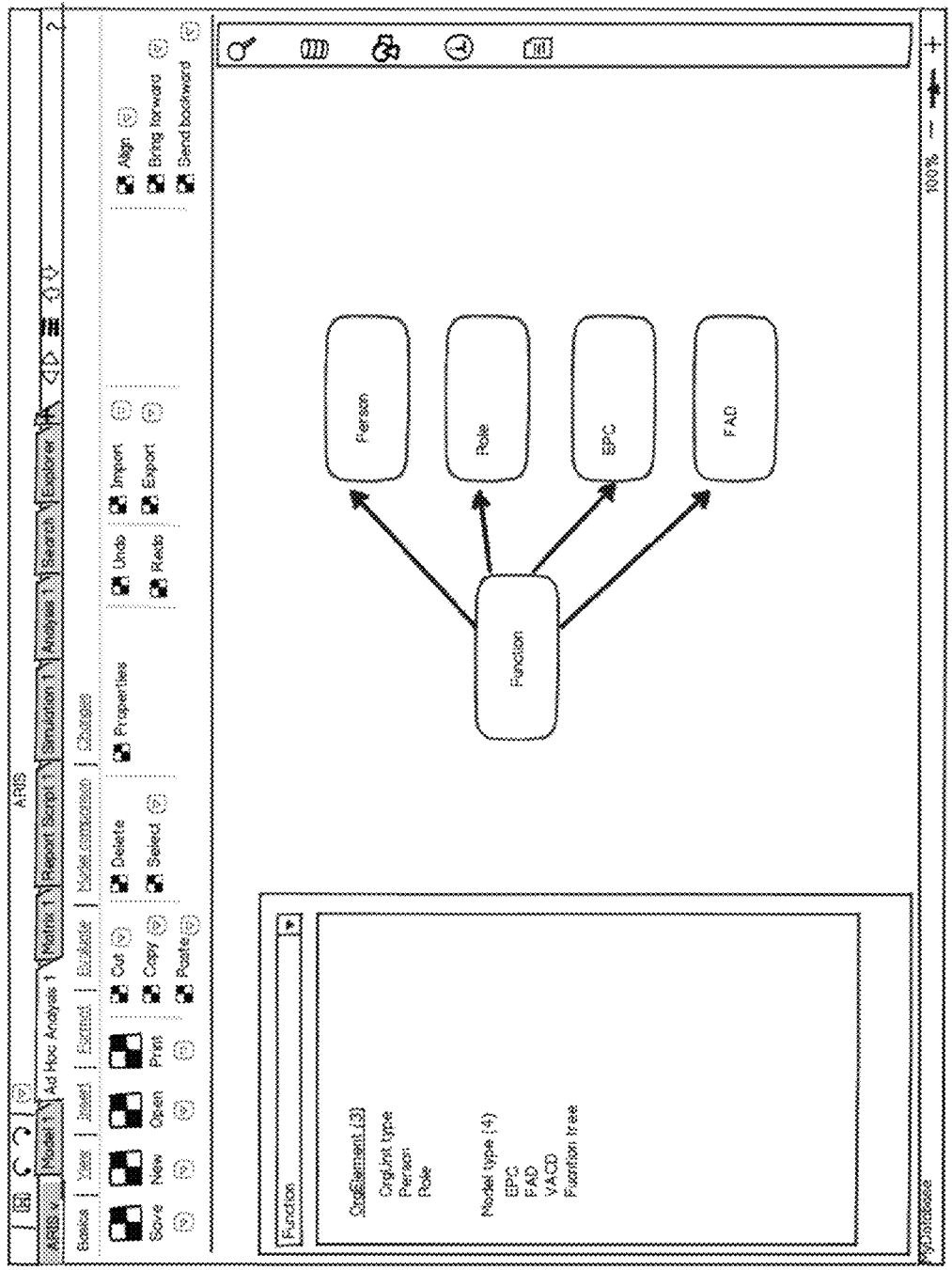
Figure 7:
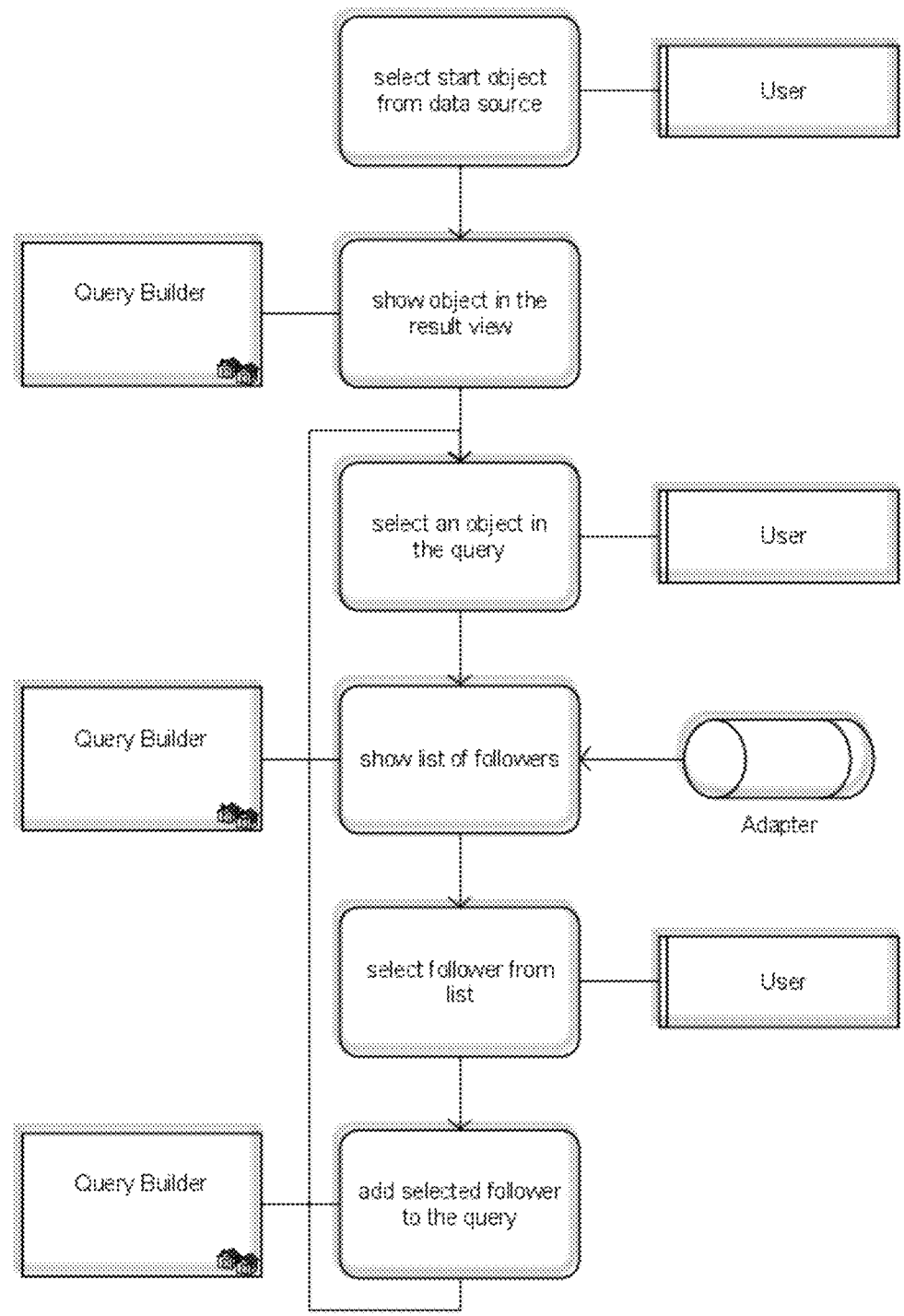
Figure 8A:
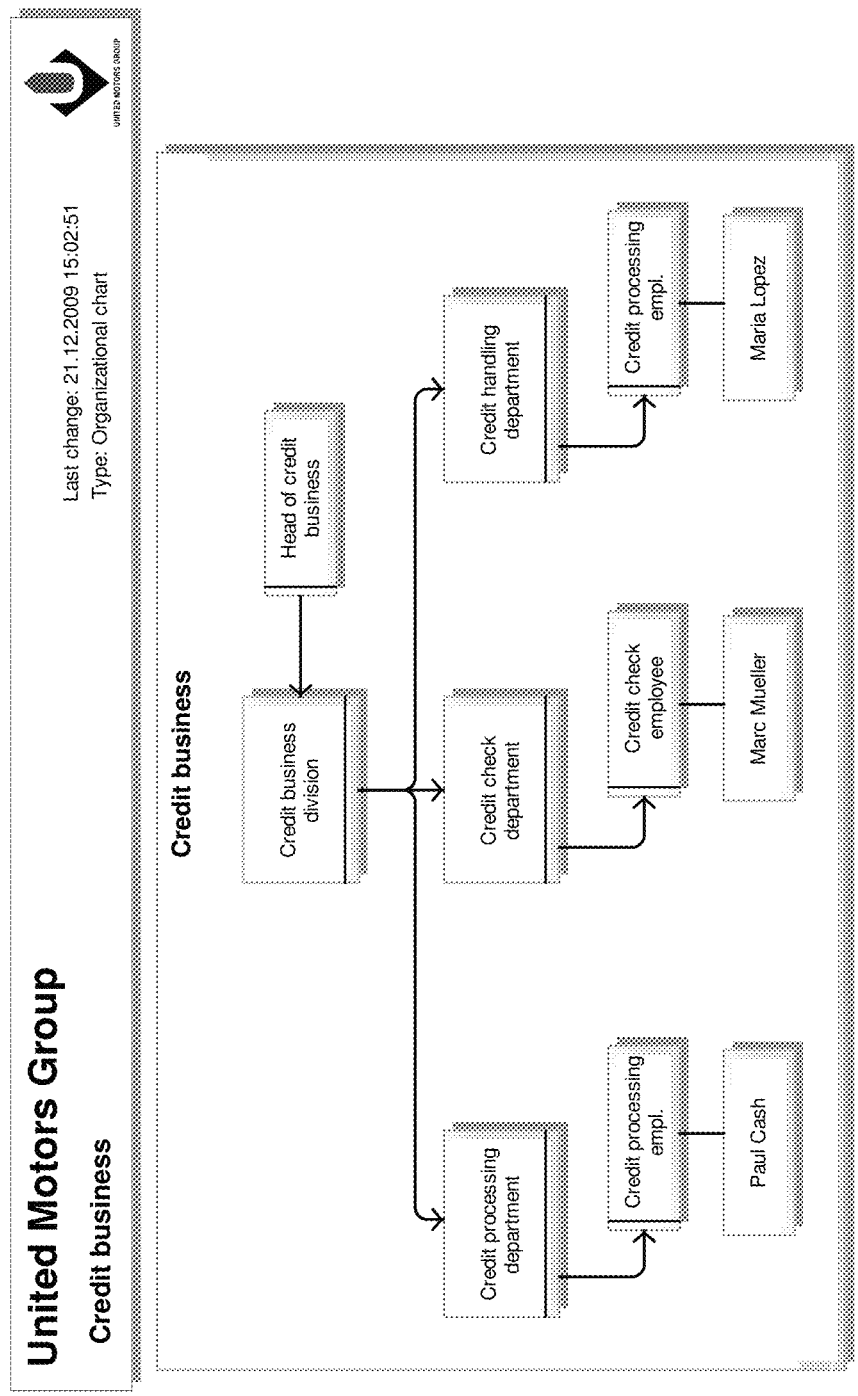
Figure 8B:
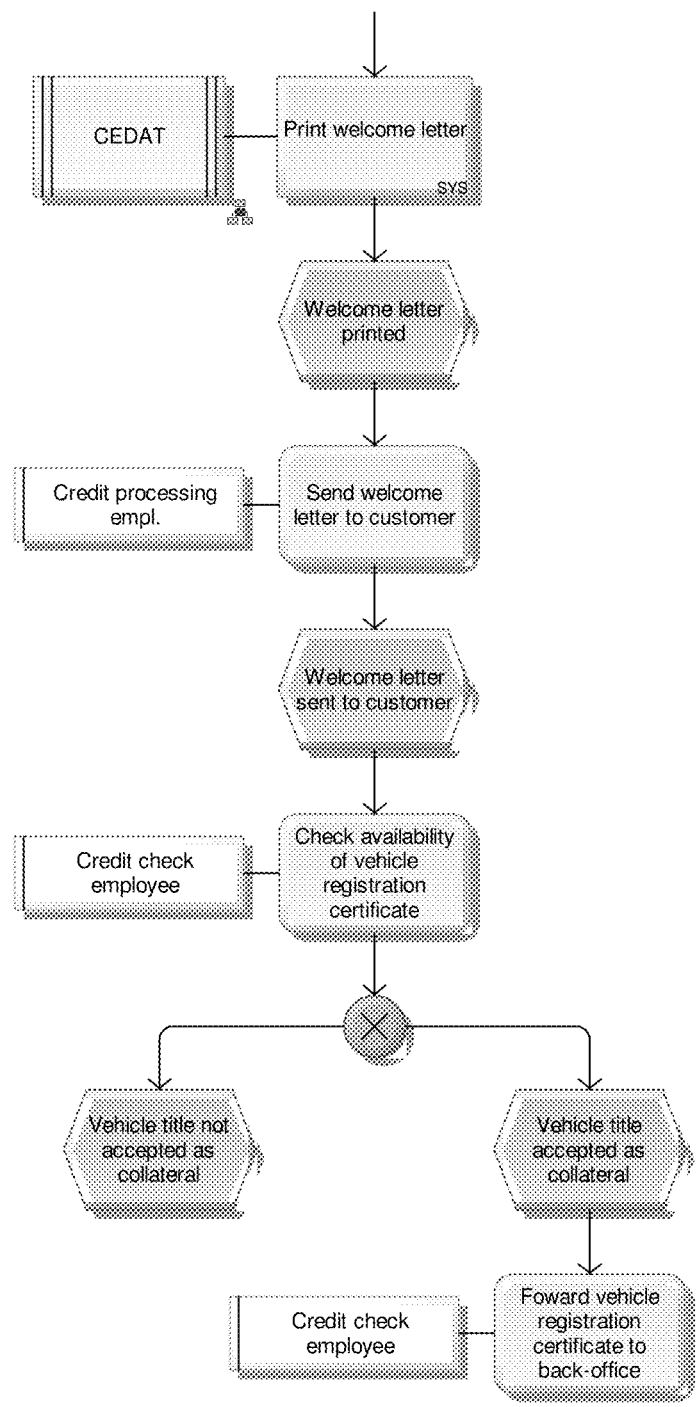
Figures 8C, 8D:
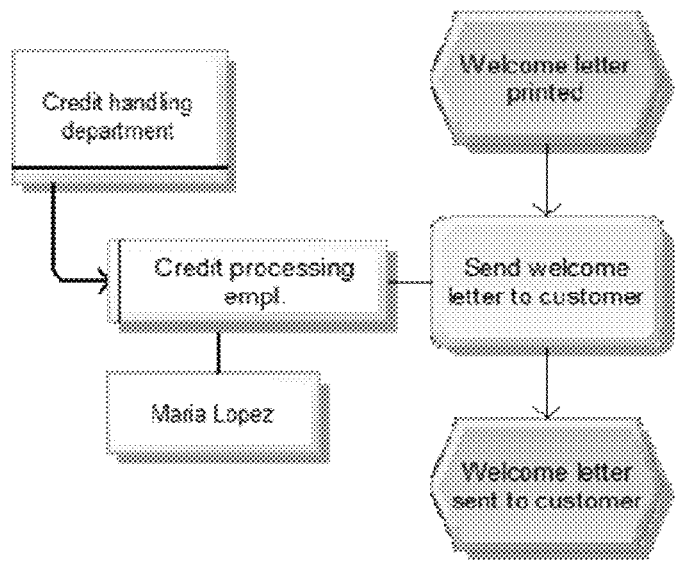

In the following detailed description, presently preferred embodiments are further described with reference to the following figures:

FIG. 1: A block diagram illustrating an embodiment of a system according to certain example embodiments;

FIG. 2: A schematic representation of a graphical query represented as a query graph with query objects and query relations as used in certain example embodiments;

FIG. 3a: An exemplary query graph illustrating a start query object, a relation and a target query object as used in certain example embodiments FIG. 3b: An exemplary query graph illustrating a filter relation as used in certain example embodiments;

FIG. 3c: An exemplary query graph illustrating a filter condition for a query object as used in certain example embodiments;

FIG. 3d: An exemplary query graph illustrating the definition and usage of user-defined relations as used in certain example embodiments;

FIG. 4a: A flow chart illustrating the steps performed during a login using a login form with two parts as used in certain example embodiments FIGS. 4b and 4c: Exemplary screenshots of the login steps 1 and 2 of FIG. 4a;

FIG. 5: A schematic overview of the contents of the meta model MM provided by certain example embodiments;

FIG. 6: An exemplary graphical user interface for the query builder QB of certain example embodiments;

FIG. 7: A flow chart illustrating the iterative query definition supported by certain example embodiments;

FIGS. 8a and 8b: Examples of an organizational chart and a business process model as used in certain example embodiments FIG. 8c: An example of an implicit relation in the models of FIGS. 8a and 8b;

FIG. 8d: An example of a report in JavaScript according to the prior art; and

FIGS. 9a-g: Exemplary screenshots illustrating a graphical user interface for creating queries in accordance with certain example embodiments.

4. DETAILED DESCRIPTION

In the following, a presently preferred embodiment is described with respect to a system as schematically shown in FIG. 1. The exemplary system comprises a graphical query builder QB and three adapters A1, A2 and A3, wherein each adapter provides access to a respective data source DS1, DS2 and DS3. As will be appreciated, the present invention is not limited to the depicted three adapters, but may support systems comprising any number of adapters.

The query builder QB offers users of modelling tools the possibility to define queries upon models in the same way as they create the models themselves. To build queries for analyses and/or evaluations, users of the modelling tool need no experience in programming languages and no information about the database structure.

Queries and Query Definition:

A query can be essentially understood as a "question" that a user asks a data source, for example:

How do the processes on level 2 and 3 look like for my area?

Which business services are needed to support which milestone?

Which business services are missing to support a goal?

How does my information model look like?

How do my information objects interact with each other?

The user defines such a query ("question") visually as a query graph in the query builder QB, which results in a query definition. Such a query definition may be stored and later reused, i.e. it can be used in the query builder QB as a part of another query or it can be loaded into the query builder QB and can be changed.

Query Definitions, Data Sources and Adapters:

The query builder QB of certain example embodiments allows the creation of queries on different data sources DS. The queries are all defined in the same way and have the same basic structure, which is possible because there is an adapter A for each data source DS. The adapter A provides access to the data source DS in a standardized format, i.e. in accordance with a common meta model MM (cf. FIG. 1). Adapters A allow the query builder QB to "understand" different data sources DS. Thus, the user can create a query definition in the query builder QB for each data source DS for which an adapter A is available.

A query definition may query data from more than one data source DS at once and combine these data in one result. For example, a user may create a query that queries data for a RACI chart from an ARIS database and it could also query additional data for each person that is assigned to a role from an HR database. After the execution, the user will get a RACI chart with detailed information about persons that are assigned to roles as one report.

The meta model MM of the query builder QB abstracts from the underlying meta model of the data source DS. Preferably, the query builder's meta model MM only knows items, relations and item information. Only items may comprise item information. Items and relations may comprise types or names. Item information may comprise a type or name and a value.

Query Graph:

A query graph is the graphical representation of a query. A query graph may comprise query objects, query relations and special input query objects. A query graph is preferably a directed graph with exactly one query start object.

An exemplary query graph comprising five query objects Q1, ..., Q5 and four relations R1, ..., R4 is shown in FIG. 2.

A query definition may further comprise a name and/or an optional description. The user may set the name and the description in multiple languages.

Query Objects:

Query objects O (cf. FIG. 2) are the main building blocks of a query graph. In essence, a query object O defines what kind of data the user wants to obtain and a relation R defines how to navigate from a source query object O to a target query object O (in the example of FIG. 2, the relation R1 defines a navigation path from query object O1 to query object O2).

FIG. 3a illustrates an example in which the target query object specifies that it can be a model (or even a list of any models). The relation (the arrow in FIG. 3a) defines a relationship to a source query object, wherein said source query object again specifies a data type, in this example a database (DB). In summary, the example of FIG. 3a reflects that the user wants to obtain all models from a database.

Query Relations:

A query relation represents the relationship between item types represented by source and target query objects. Relations are provided by the adapter(s) and there does not have to be a relation for each combination of item types. A query relation is represented in the query graph as directed line that connects two query objects (cf. again FIG. 3a).

Filter Relations:

A query graph may also comprise a special usage of query relations, namely each query relation may be used also as a so-called filter relation. Data produced by this filter relation are intersected with data produced by all incoming ordinary query relations.

For example, FIG. 3b shows a query graph for obtaining all EPCs that are assigned to a Value Added Chain Diagram (VACD) and which are contained in a specific group.

Query objects may have more than one incoming filter relation and also more than one outgoing filter relation. Preferably, incoming filter relations are combined with a logical "AND" operation by definition, unless otherwise indicated in the respective query graph. As shown in FIG. 3b, filter relations preferably have a different graphical representation than an ordinary query relation.

Filter Conditions:

A user may add filter conditions to query objects by their item information. If the query object represents more than one item type, only the common item information are preferably available for the filtering. Besides filter relations, this represents the second form of filtering.

The adapter for a given data source preferably specifies which item information can be used as filter condition. In these conditions a user may compare any item information with a constant and/or with input (in this case the user has to specify a value or the like as input).

For example, FIG. 3c shows that the user wants all functions that have an average processing time smaller or equal than 2 hours.

User-Defined Relations:

A query graph may comprise a further special type of query relation called user-defined relation. A user-defined relation is a user-defined "sub query" that is represented in the query graph as a single query relation. Each user defined relation ("sub query") preferably has a name and is stored in a central repository. When such a user defined relation is defined and stored, it is automatically handled like all other relations defined by the adapter.

A sub query from which a user can create a user-defined relation may contain various query objects, relations, filter relations or even recursive relations.

The sub query may combine item types and relations from multiple adapters, like any other query, but there are also some general limitations. Preferably, the sub query must have only one beginning query object and one end query object. These query objects will define the source and target of the user-defined relation. The user can then use the user defined relation only between these two objects, as shown in FIG. 3d.

Preferred Implementation

In the following, a preferred implementation of the above-explained concepts underlying certain example embodiments is explained. The exemplary system to define queries independent from the underlying data source described hereinafter comprises a server part, a collection of adapters and a client.

Preferred Implementation of the Server Part:

The server part is responsible to persist queries in a database (or other persistent storage medium) and to load persisted queries. The server part preferably also checks user rights (read/write/delete rights or the like) and stores user-defined relations.

The adapters are responsible to provide access to their corresponding data sources for the query builder in a uniform manner (also referred to as "data source independent format"). In other words, the adapters abstract from a particular type of the data source (also referred to as "data source specific format") from the query builder's point of view. In particular, an adapter provides a methodology (meta information about provided data types), executes queries and provides the results of an execution of a query.

In the following, an exemplary definition of an API (application programming interface) every adapter has to implement and/or to provide is presented.

Since Adapters are preferably RESTful web services (cf. http://en.wikipedia.org/wiki/Representational_state_transfer), the following definitions are provided in the form of resource address (URL), HTTP methods supported by the respective resource, required parameters, response formats and possible return codes.

To be useable by the query builder, all adapters have to be registered at the server of the query builder system.

Adapter Api

In a preferred embodiment, the Adapter API is divided into three parts:

Adapter meta information API—provides access to the basic information about adapter Adapter meta model API—provides access to the meta model (e.g. ARIS method) in a general format which is common for all adapters Query execution API—allows execution of queries on the adapter and provides access to results Each of these parts preferably groups URIs which provide access to a related set of resources.

HTTP Status Codes

In the preferred embodiment, the adapters may return the following HTTP status codes:

200 OK—is returned always when a GET request is successful

201 Created—is returned when a new resource is successfully created, e.g. when a new job is created 204 No content—is returned after a successful DELETE request, e.g. when a specific job is removed 400 Bad request—is returned if a request could not be understood by the server due to malformed syntax, e.g. when a paging parameter contains negative numbers 401 Unauthorized—is returned if the requested resource has restricted access and a credential is missing or authorization has been refused for the provided credentials 404 Not found—is returned if no resource matches the request URI, e.g. when the client is requesting a job which was already deleted The above HTTP status codes generally conform to RFC 2616: Hypertext Transfer Protocol—HTTP/1.1, Chapter 10 (available at http://tools.ietf.org/html/rfc2616).

Authentication and Authorization

Data in a data source may be protected (e.g. by a password) and only a limited number of users is granted access. To this end, adapters which work with password protected data sources may support an authentication and authorization mechanism. The query builder client then comprises a login form, and will preferably send all needed properties as a custom HTTP header in each request:

```
<loginForm>
    <part order="1">
        <property>
            <id>DATABASE</id>
            <value>Demo database</value>
        </property>
        <property>
            <id>LOGIN</id>
            <value>my_username</value>
        </property>
        <property>
            <id>PASSWORD</id>
            <value>my_password</value>
        </property>
    </part>
</loginForm>
```

Preferably, adapters use the XML format, but the semantics (i.e. meaning) of values or the number of properties may depend on the implementation of the respective adapter. Further, the login information may be divided into multiple steps and properties in the next step may depend on values from the previous step, as illustrated in FIG. 4a.

Figure 4B:
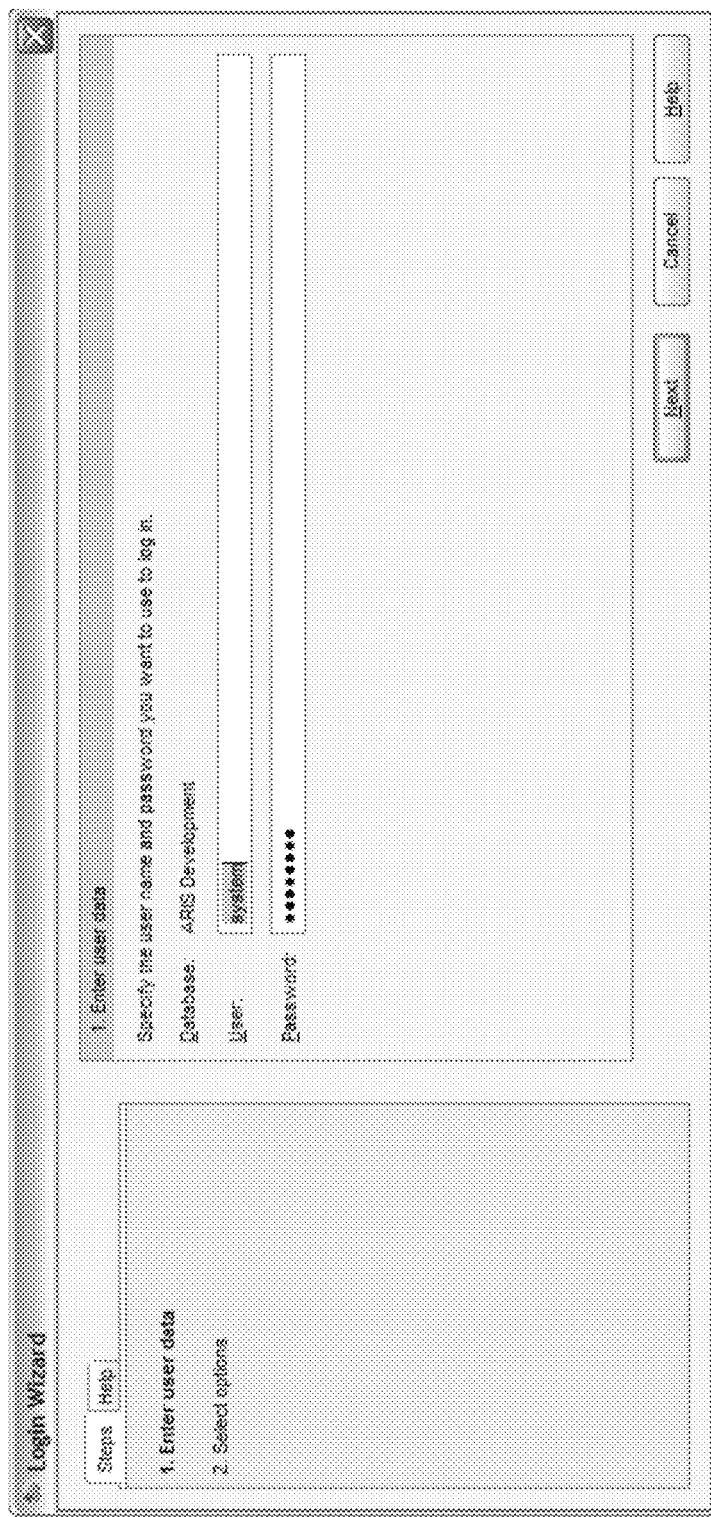
Figure 4C:
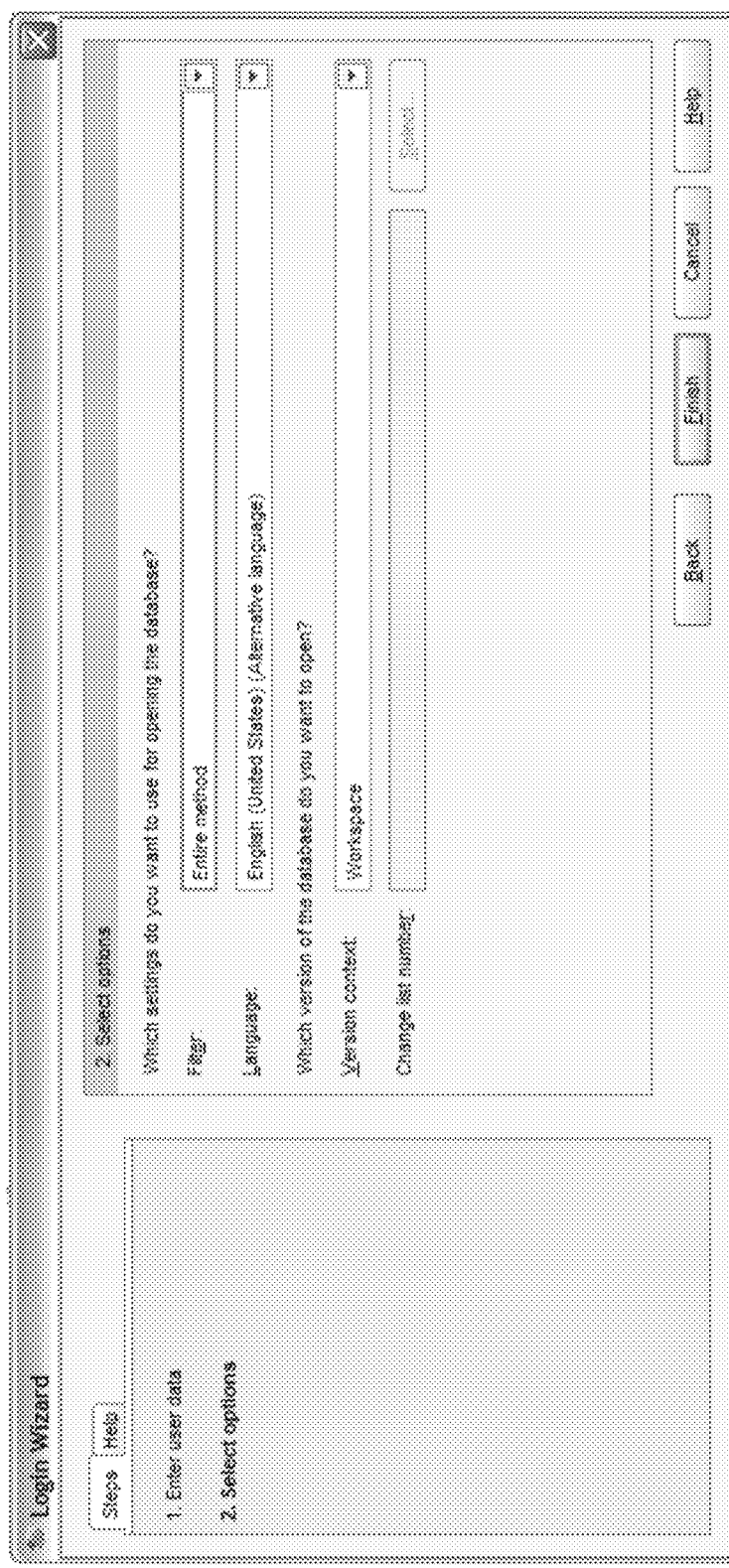

FIGS. 4b and 4c illustrate an example of a two-step login form (e.g. in the ARIS Business Architect product of applicant). In the first step (cf. FIG. 4b), the user provides his user name and password. Depending on these credentials, the user specifies the method filter which is used in ARIS Business Architect (cf. FIG. 4c). The filters proposed in the second step depend on the user information of step 1. Not all users are allowed to use all defined method filters.

Meta Information—Adapter information

Adapters preferably provide read-only access to basic information about itself. This information is mainly static:

| | |
|---|---|
| Operation | GET |
| Access | Free |
| Query parameters | No |
| Paging | No |
| Description | Returns basic information about adapter. Name, type, version and etc. |
| MIME | application/vnd.softwareag.octopus-adapter.info+xml |
| Representation example | `<info >`<br>  `<id>ADAPTER_ID</id>`<br>  `<name>Production Business Server Adapter</name>`<br>  `<type>BUSINESS_SERVER_ADAPTER</type>`<br>  `<version>1.0</version>`<br>`</info>` |
| Status Codes | 200 OK |

Meta Information—Login Form

Adapters may provide a generic login form format. The Format is preferably generic since different data sources may have different login parameters. The client can preferably only retrieve this form. The filled-in form has to be part of each request which uses (CRUD) a resource with restricted access (cf. section "Authentication and authorization" further above):

| | |
|---|---|
| Operation | GET |
| Access | Free |
| Query parameters | No |
| Paging | No |
| Description | Returns login form which defines login parameters for data-source. This form is generic. Login form can have multiple parts. If content of next part of form depends on information filled in previous part of form then the next part is returned only if request contains HTTP header with values for previous part. See chapter "Authentication and authorization". |
| MIME | application/vnd.softwareag.octopus-adapter.loginform+xml |
| Representation example | `<loginForm>`<br>  `<part order="1">`<br>    `<property id="PROP_1">`<br>      `<label>Login</label>`<br>      `<simpleDataType>`<br>        `<primitive>`<br>          `<type>STRING</type>`<br>        `</primitive>`<br>      `</simpleDataType>`<br>    `</property>`<br>    `<property id="PROP_2">`<br>      `<label>Password</label>`<br>      `<simpleDataType>`<br>        `<primitive>`<br>          `<type>STRING</type>`<br>        `</primitive>`<br>      `</simpleDataType>`<br>    `</property>`<br>  `</part>`<br>`</loginForm>` |
| Status Codes | 200 OK |

Meta Information—Supported Features

An adapter may support the entire query language of the corresponding data source or only a subset thereof. Clients may retrieve a list of features which are supported by a particular adapter:

| | |
|---|---|
| Operation | GET |
| Access | Restricted |
| Query parameters | No |
| Paging | No |
| Description | Returns list of supported query language features. |
| MIFE | application/vnd.softwareag.octopus-adapter.features+xml |
| Representation example | `<features>`<br>  `<feature id="QL_FEATURE_1"/>`<br>  `<feature id="QL_FEATURE_2"/>`<br>  `<feature id="QL_FEATURE_3">`<br>`</features>` |
| Status Codes | 200 OK<br>401 Unauthorized |

Meta Information—Meta Model API

The meta model MM (cf. FIG. 1) is represented by one or more collections of resources. The client can request all collections, a subset of collections or it can access specific resources from a collection. Each collection is identified by its own URI ("uniform resource identifier") and also each specific resource in the collection has its own URI. Also the meta model itself as set of collections has its own URI. All resources in the meta model API are preferably read-only for the client. Resources refer one to another via the URIs. FIG. 5 illustrates a to preferred example of the structure of the meta model API.

There is a special representation of the meta model which can be retrieved by client, which ensures that the client can access each part of the meta model without the need to construct URIs:

| | |
|---|---|
| Operation | GET |
| Access | Restricted |
| Query parameters | No |
| Paging | No |
| De- | Returns representation of whole method in general format. |

-continued

| | |
|---|---|
| scription | Returned representation contains links to basic collections of resources which belong to method. |
| MIME | application/vnd.softwareag.octopus-adapter.method+xml |
| Representation example | `<method>`<br>    `<itemTypes href="adapter/method/item_types"/>`<br>    `<relationTypes href="adapter/method/relation_types"/>`<br>    `<attrTypes href="adapter/method/attribute_types"/>`<br>    `<itemTypeCategories href="adapter/method/item_type_categories"/>`<br>    `<attrTypeCategories href="adapter/method/attr_type_categories"/>`<br>    `<relationTypeCategories href="adapter/method/relation_type_categories"/>`<br>    `<enums href="adapter/method/enums"/>`<br>`</method>` |
| Status Codes | 200 OK<br>401 Unauthorized |

Meta Information—Item Types

As explained above, the meta model preferably comprises a collection of item types. A client can request the entire collection or only a subset via query parameters which work like filter criteria:

| | |
|---|---|
| Operation | GET |
| Access | Restricted |
| Query parameters | Yes |
| Paging | Yes |
| Description | Returns collection of all item types or some subset of it. |
| MIME | application/vnd.softwareag.octopus-adapter.itemtypes+xml |
| Representation example | `<itemTypes>`<br>    `<itemType id=" IT_MODEL" href="adapter/method/item_types/IT_MODEL">`<br>        `<name>Model</name>`<br>        `<canBeStartObject>true</canBeStartObject>`<br>        `<canBeInputObjec>true</canBeInputObjec>`<br>        `<attributeTypes href="adapter/method/item_types/IT_MODEL/attribute_types"/>`<br>    `</itemType>`<br>`</itemTypes>` |
| Status Codes | 200 OK<br>400 Bad request<br>401 Unauthorized<br>404 Not found |

Supported Query Parameters:

| | |
|---|---|
| Query parameter | id |
| Example URI | adapter/method/item_types?id=IT_EVENT<br>adapter/method/item_types?id=IT_EVENT,IT_FUNC |
| Description | Filters collection of item types according to ID of item type. Client can query one or more item types with specific item type ID. |

| | |
|---|---|
| Query parameter | parent_id |
| Example URI | adapter/method/item_types?parent_id=IT_MODEL |
| Description | Filters collection of item types according to item type parent ID. Client can query all item types which has common parent item type specified by parent item type ID. |

Meta Information—Specific Item Type

Each item type is identified by a unique URI. The client can access each specific item type via this URI. Other resources refer to the specific item type via this URI. A list of attribute types which belongs to item type is considered to be a separate resource and is also referenced via a URI. If an item type does not specify that it can/cannot be a start object item type then this information is inherited from the parent item type:

| | |
|---|---|
| Operation | GET |
| Access | Restricted |
| Query parameters | No |
| Paging | No |
| Description | Returns representation of specific item type. |
| MIME | application/vnd.softwareag.octopus-adapter.itemtype+xml |
| Representation example | `<itemType id="IT_MODEL" href="adapter/method/item_types/IT_MODEL">`<br>    `<name>Model</name>`<br>    `<!--tag is optional-->`<br>    `<canBeStartObject value="true"/>`<br>    `<!--tag is optional-->`<br>    `<canBeInputObjec value="true"/>`<br>    `<attributeTypes href="adapter/method/item_types/IT_MODEL/attribute_types"/>`<br>`</itemType>` |

-continued

| Status Codes | 200 OK |
| --- | --- |
| | 400 Bad request |
| | 401 Unauthorized |
| | 404 Not found |

Meta Information—Attributes of Specific Item Type

Each item type supports a set of attribute types. This list of attribute types is a resource and has its own URI:

| Operation | GET |
| --- | --- |
| Access | Restricted |
| Query parameters | No |
| Paging | No |
| Description | Returns representation of all attribute types which are allowed for specific item type. |
| MIME | application/vnd.softwareag.octopus-adapter.itemtype-attributetypes+xml |
| Representation example | `<attributeTypes>`<br>`<attributeType id="AT_NAME" href="adapter/method/attribute_types/AT_NAME"/>`<br>`<attributeType id="AT_AUTHOR" href="adapter/method/attribute_types/AT_AUTHOR"/>`<br>`<attributeType id="AT_TYPE" href="adapter/method/attribute_types/AT_TYPE"/>`<br>`</attributeTypes>` |
| Status Codes | 200 OK |
| | 400 Bad request |
| | 401 Unauthorized |
| | 404 Not found |

Meta Information—Relation types

The client can retrieve the entire collection of relation types, some subset of the collection or a specific relation type. A subset of the collection can be queried via query parameters which work like filter criteria:

| Operation | GET |
| --- | --- |
| Access | Restricted |
| Query parameters | Yes |
| Paging | Yes |
| Description | Returns collection of all relation types or some subset of it. It supports general paging mechanism and multiple query parameters. |
| MIME | application/vnd.softwareag.octopus-adapter.relationtypes+xml |
| Representation example | `<relationTypes>`<br>`<relationType id="RT_CONTAINS_OBJ" href="adapter/method/relation_types/RT_CONTAINS_OBJ">`<br>`<name>contains objects</name>`<br>`<source id="IT_MODEL" href="adapter/method/item_types/IT_MODEL"/>`<br>`<target id="IT_OBJ" href="adapter/method/item_types/IT_OBJ"/>`<br>`</relationType>`<br>`</relationTypes>` |
| Status Codes | 200 OK |
| | 400 Bad request |
| | 401 Unauthorized |
| | 404 Not found |

Supported Query Parameters:

| Query parameter | Id |
| --- | --- |
| Example URI | adapter/method/relation_types?id=IT_EVENT<br>adapter/method/relation_types?id=IT_EVENT,IT_FUNC |
| Description | Filters collection of relation types according to ID of relation type. Client can query one or more relation types with specific relation type ID. |

| Query parameter | parent_id |
| --- | --- |
| Example URI | adapter/method/relation_types?parent_id=RT_HAS_RELATION_TO_OBJ |
| Description | Filters collection of relation types according to relation type parent ID. Client can query all relation types which has common parent relation type specified by parent relation type ID. |

| Query parameter | case_of |
| --- | --- |
| Example URI | adapter/method/relation_types?case_of=RT_CONTAINS |
| Description | Filters collection of relation types according to ID of superior relation types. Client will receive all relation types which are "caseOf" of relation type specified by ID. |

| Query parameter | source_id |
| --- | --- |
| Example URI | adapter/method/relation_types?source_id=IT_EVENT |
| Description | Filters collection of relation types according to source item type ID. Client can query all relation types which have as source specific item type. |

| | |
|---|---|
| Query parameter | target_id |
| Example URI | adapter/method/relation_types?target_id=IT_FUNC |
| Description | Filters collection of relation types according to target item type ID. Client can query all relation types which have as target specific item type. |

Meta Information—Specific Relation Type

As explained above, each relation type is identified by its own URI. Other resources refer to the relation type via its URI. The relation type references other resources such as source and target item type(s) and/or parent relation type also via URIs:

| | |
|---|---|
| Operation | GET |
| Access | Restricted |
| Query parameters | No |
| Paging | No |
| Description | Returns representation of specific relation type. |
| MIME | application/vnd.softwareag.octopus-adapter.relationtype+xml |
| Representation example | `<relationType id="RT_CONTAINS_OBJ" href="adapter/method/relation_type/RT_CONTAINS_OBJ">`<br>`  <name>contains objects</name>`<br>`  <source id="IT_MODEL" href="adapter/method/item_types/IT_MODEL"/>`<br>`  <target id="IT_OBJ" href="adapter/method/item_types/IT_OBJ"/>`<br>`</relationType>` |
| Status Codes | 200 OK<br>400 Bad request<br>401 Unauthorized<br>404 Not found |

Meta Information—Attribute types

The meta model contains a collection of attribute types. The client can retrieve the entire collection of attribute types, a subset of this collection or a specific attribute type. The collection of all attribute types is identified by a URI:

| | |
|---|---|
| Operation | GET |
| Access | Restricted |
| Query parameters | Yes |
| Paging | Yes |
| Description | Returns collection of all attribute types or some subset of it. It supports general paging mechanism and multiple query parameters. |
| MIME | application/vnd.softwareag.octopus-adapter.attributetypes+xml |
| Representation example | `<attributeTypes>`<br>`  <attributeType id="AT_NAME" href="adapter/method/attribute_types/AT_NAME">`<br>`    <name>Name</name>`<br>`    <simpleDataType>`<br>`      <primitive>`<br>`        <type>STRING</type>`<br>`      </primitive>`<br>`    </simpleDataType>`<br>`  </attributeType>`<br>`</attributeTypes>` |
| Status Codes | 200 OK<br>400 Bad request<br>401 Unauthorized<br>404 Not found |

Supported Query Parameters:

| | |
|---|---|
| Query parameter | item_type_id |
| Example URI | adapter/method/attribute_types?item_type_id=IT_FUNC<br>adapter/method/attribute_types?item_type_id=IT_FUNC,IT_EVENT |
| Description | Filters collection of all attribute types to those which are allowed for specific item type. If more than one item type is specified then only those attribute types which are common for all these item types will be returned. |

Meta Information—Specific Attribute Type

Each attribute type is identified by its own URI. He client can retrieve a representation of each attribute type via its URI:

| | |
|---|---|
| Operation | GET |
| Access | Restricted |
| Query parameters | No |
| Paging | No |
| Description | Returns representation of specific attribute type. |
| MIME | application/vnd.softwareag.octopus-adapter.-attributetype+xml |
| Representation example | `<attributeType id="AT_AVG_TOT_COST" href="adapter/method/attribute_types/AT_AVG_TOT_COST">`<br>`  <name>Last change</name>`<br>`  <compositeDataType>`<br>`    <dataTypeItem order="1">`<br>`      <primitive>`<br>`        <type>FLOAT</type>`<br>`      </primitive>`<br>`    </dataTypeItem>`<br>`    <dataTypeItem order="2">`<br>`      <enum id="CURRENCY" href="adapter/method/enums/CURRENCY"/>`<br>`    </dataTypeItem>`<br>`  </compositeDataType>`<br>`</attributeType>` |
| Status Codes | 200 OK<br>400 Bad request<br>401 Unauthorized<br>404 Not found |

Meta Information—Categories

Item types, relation types and/or attribute types may be organized in categories. There are three kinds of categories:

Item type category

Attribute type category

Relation type category

The client can retrieve a collection of categories of one kind, some subset of this collection or a specific category.

Item Type Categories:

| | |
|---|---|
| Operation | GET |
| Access | Restricted |
| Query parameters | Yes |
| Paging | Yes |
| Description | Returns collection of item type categories. Client can query subset of it. It supports general paging mechanism and multiple query parameters. |
| MIME | application/vnd.softwareag.octopus-adapter.itemtypecategories+xml |
| Representation example | <itemTypeCategories><br>  <itemTypeCategory id="CT_DATA_VIEW_MODELS" href="adapter/method/item_type_categories/CT_DATA_VIEW_MODELS"><br>    <name>Data view models</name><br>    <itemType id="IT_EERM" href="adapter/method/item_types/IT_EERM"/><br>    <itemType id="IT_KPI_TREE" href="adapter/method/item_types/IT_KPI_TREE"/><br>  </itemTypeCategory><br>  <itemTypeCategory id="CT_XYZ" href="adapter/method/item_type_categories/CT_XYZ"><br>    <name>Category xyz</name><br>    <itemTypeSubCategory id="CT_SUB_XYZ_1" href="adapter/method/item_type_categories/CT_SUB_XYZ_1"/><br>    <itemTypeSubCategory id="CT_SUB_XYZ_2" href="adapter/method/item_type_categories/CT_SUB_XYZ_2"/><br>  </itemTypeCategory><br></itemTypeCategories> |
| Status Codes | 200 OK<br>400 Bad request<br>401 Unauthorized<br>404 Not found |

Supported Query Parameters:

| | |
|---|---|
| Query parameter | id |
| Example URI | adapter/method/item_type_categories?id=CT_BPMN_MODELS<br>adapter/method/item_type_categories?id=CT_BPMN_MODELS, CT_EPC_MODELS |
| Description | Filters collection of item type categories according to ID of category. Client can query one or more category with specific category ID. |

| | |
|---|---|
| Query parameter | child_id |
| Example URI | adapter/method/ item_type_categories?child_id=IT_EPC |
| Description | Filters collection of all categories to those which contains child with specified ID. Client use as parameter, ID of category or ID of item type. |

Specific Item Type Category:
    Each item type category is identified by its own URI.

| | |
|---|---|
| Operation | GET |
| Access | Restricted |
| Query parameters | No |
| Paging | No |
| Description | Returns specific representation of specific item type category. |
| MIME | application/vnd.softwareag.octopus-adapter.itemtypecategory+xml |
| Representation example | <itemTypeCategory id="CT_DATA_VIEW_MODELS" href="adapter/method/item_type_categories/CT_DATA_VIEW_MODELS"><br>  <name>Data view models</name><br>  <itemType id="IT_EERM" href="adapter/method/item_types/IT_EERM"/> |

-continued

|  |  |
|---|---|
|  | <itemType id="IT_KPI_TREE"<br>href="adapter/method/item_types/IT_KPI_TREE"/><br></itemTypeCategory> |
| Status Codes | 200 OK<br>400 Bad request<br>401 Unauthorized<br>404 Not found |

Relation Type Categories:

| | |
|---|---|
| Operation | GET |
| Access | Restricted |
| Query parameters | Yes |
| Paging | Yes |
| Description | Returns collection of relation type categories. Client can query subset of it. It supports general paging mechanism and multiple query parameters. |
| MIME | application/vnd.softwareag.octopus-adapter.relationtypecategories+xml |
| Representation example | <relationTypeCategories><br><!--NOTE: all IDs are just dummy--><br><relationTypeCategory id="CT_RELATION_CAT_1"<br>href="adapter/method/relation_type_categories/CT_RELATION_CAT_1"><br>  <name>Category name</name><br>  <relationType id="RT_XYZ_1"<br>href="adapter/method/relation_types/RT_XYZ_1"/><br>  <relationType id="RT_XYZ_2"<br>href="adapter/method/relation_types/RT_XYZ_2"/><br>  <relationTypeSubCategory id="CT_RELATION_CAT_2"<br>href="adapter/method/relation_type_categories/CT_RELATION_CAT_2"/><br></relationTypeCategory><br><relationTypeCategory id="CT_RELATION_CAT_2"<br>href="adapter/method/relation_type_categories/CT_RELATION_CAT_2"><br>  <name>Category name</name><br>  <relationType id="RT_XYZ_3"<br>href="adapter/method/relation_types/RT_XYZ_3"/><br>  <relationType id="RT_XYZ_4"<br>href="adapter/method/relation_types/RT_XYZ_4"/><br></relationTypeCategory><br></relationTypeCategories> |
| Status Codes | 200 OK<br>400 Bad request<br>401 Unauthorized<br>404 Not found |

Supported Query Parameters:

| | |
|---|---|
| Query parameter | id |
| Example URI | adapter/method/relation_type_categories?id= RT_XYZ_1<br>adapter/method/relation_type_categories?id= RT_XYZ_1, RT_XYZ_2 |
| Description | Filters collection of relation type categories according to ID of category. Client can query one or more category with specific category ID. |

| | |
|---|---|
| Query parameter | child_id |
| Example URI | adapter/method/relation_type_categories?child_id= RT_XYZ_1 |
| Description | Filters collection of all categories to those which contains child with specified ID. Client use as parameter, ID of category or ID of item type. |

Specific Realtion Type Category:

| | |
|---|---|
| Operation | GET |
| Access | Restricted |
| Query parameters | No |
| Paging | No |
| Description | Returns specific representation of specific relation type category. |
| MIME | application/vnd.softwareag.octopus-adapter.relationtypecategory+xml |
| Representation example | <relationTypeCategory<br>id="CT_RELATION_CAT_1"<br>href="adapter/method/relation_type_categories/CT_RELATION_CAT_1"><br>  <name>Category name</name> |

```
              <relationType id="RT_XYZ_1"
              href="adapter/method/relation_types/RT_XYZ_1"/>
                  <relationType id="RT_XYZ_2"
              href="adapter/method/relation_types/RT_XYZ_2"/>
                  <relationTypeSubCategory id="CT_RELATION_CAT_2"
              href="adapter/method/relation_type_categories/CT_RELATION_CAT_2"/>
              </relationTypeCategory>
Status Codes  200 OK
              400 Bad request
              401 Unauthorized
              404 Not found
```

Meta Information—Attribute Type Categories

| | |
|---|---|
| Operation | GET |
| Access | Restricted |
| Query parameters | Yes |
| Paging | Yes |
| Description | Returns collection of attribute type categories. Client can query subset of it. It supports multiple query parameters. |
| MIME | application/vnd.softwareag.octopus-adapter.itemtypecategories+xml |
| Representation example | `<attrTypeCategories>`<br>`<attrTypeCategory id="CT_MDL_STATE"`<br>`href="adapter/method/attr_type_categories/CT_MDL_STATE">`<br>`<name>Model status</name>`<br>`<attributeType id="AT_STATE_1"`<br>`href="adapter/method/attribute_types/AT_STATE_1"/>`<br>`<attributeType id="AT_SINCE"`<br>`href="adapter/method/attribute_types/AT_SINCE"/>`<br>`</attrTypeCategory>`<br>`<attrTypeCategory id="CT_PROCESS_AUTOMATION"`<br>`href="adapter/method/attribute_types/CT_PROCESS_AUTOMATION"`<br>`>`<br>`<name>Process automation</name>`<br>`<attributeType id="AT_SEMANTIC_CHECK_SUCCESSFUL"`<br>`href="adapter/method/attribute_types/AT_SEMANTIC_CHECK_SUCCESSFUL"/>`<br>`<attributeType id="AT_TIME)OF_LAST_SEMANTIC_CHECK"`<br>`href="adapter/method/attribute_types/AT_TIME)OF_LAST_SEMANTIC_CHECK"/>`<br>`<attributeType id="AT_AUTOMATION_CATEGORY"`<br>`href="adapter/method/attribute_types/AT_AUTOMATION_CATEGORY`<br>`"/>`<br>`<attrTypeSubCategory id="CT_LIFECYCLE_ATG"`<br>`href="adapter/method/attribute_types/CT_LIFECYCLE_ATG"/>`<br>`</attrTypeCategory>`<br>`</attrTypeCategories>` |
| Status Codes | 200 OK<br>400 Bad request<br>401 Unauthorized<br>404 Not found |

Supported Query Parameters:

| | |
|---|---|
| Query parameter | Id |
| Example URI | adapter/method/attr_type_categories?id= CT_MDL_STATE<br>adapter/method/attr_type_categories?id=CT_MDL_STATE,CT_LIFECYCLE_ATG |
| Description | Filters collection of attribute type categories according to ID of category.<br>Client can query one or more category with specific category ID. |

| | |
|---|---|
| Query parameter | child_id |
| Example URI | adapter/method/<br>attr_type_categories?child_id= AT_STATE_1 |
| Description | Filters collection of all categories to those which contains child with specified ID. Client use as parameter, ID of category or ID of item type. |

Specific Attribute Type Category:

| | |
|---|---|
| Operation | GET |
| Access | Restricted |

-continued

| | |
|---|---|
| Query parameters | No |
| Paging | No |
| Description | Returns specific representation of specific attribute type category. |
| MIME | application/vnd.softwareag.octopus-adapter.attributetypecategory+xml |
| Representation example | <attrTypeCategory id="CT_MDL_STATE" href="adapter/method/attr_type_categories/CT_MDL_STATE"><br>  <name>Model status</name><br>  <attributeType id="AT_STATE_1" href="adapter/method/attribute_types/AT_STATE_1"/><br>  <attributeType id="AT_SINCE" href="adapter/method/attribute_types/AT_SINCE"/><br></attrTypeCategory> |
| Status Codes | 200 OK<br>400 Bad request<br>401 Unauthorized<br>404 Not found |

Preferred Implementation of the Client Part:

The client part (which hosts the graphical query builder QB) may be integrated into an existing application (such as ARIS Business Architect of applicant) or it may be built as a stand-alone application. Preferably, the client communicates only via the adapter(s) with the data source(s), i.e. no direct access to the underlying data source(s) is necessary.

When formulating a query on the client, first a starting object for the query builder QB has to be defined. As soon as this start query object is defined, the user can start modeling his query. When selecting a query object the client asks the adapter for possible neighbors, proposes them in a list and after selection of the next query object in the list by the user, this object is added to the query. In other words, certain example embodiments allow for an iterative creation of queries.

In the use case of a standalone application, the user of the query builder QB has to know on which item types he wants to start the query. In the case that more than one adapter is configured in the system, the user first has to specify on which meta model, i.e. on which data source, he wants to create a query. After that, the system can support the user by auto completion to find the right item type.

In the use case of an integrated query builder QB, the start object could be defined by selecting an object of the correct type in the application and start the query builder QB via a context menu on the corresponding item type.

An exemplary implementation of the client and the graphical query builder is illustrated in FIG. 6, which shows an example of a possible client UI (user interface). The object "Function" in FIG. 6 is the start query object. By selecting this object, a list of all connectable objects is shown in the list (to the left of FIG. 6). This list will be retrieved by the adapter. In the example, an object of type "Function" can be connected to objects of types "OrgUnit type", "Person", "Role", "EPC", "FAD", "VACD" or "Function tree". These types are determined by the meta model of the data source which the adapter is representing. By selecting one of the proposed objects, the new object is added to the query graph.

This iterative process of defining a query is illustrated in more detail in FIG. 7, which shows the following sequence of steps:
1. The user selects the start query object
2. The start query object is displayed in the query view (cf. also FIG. 6)
3. The user selects an object in the query view
4. The query builder QB determines all followers with the help of the adapter A
5. The user select an object from the list of followers
6. The selected object is added as a new object to the query view
7. The process iterates by returning to step 3 above.

Illustrative Example of the Invention and Comparison to the Conventional Approach FIGS. 8a and 8b illustrate how structural information may be modeled in accordance with different model types, i.e. adhering to different heterogeneous data source specific formats.

More specifically, FIG. 8a illustrates a typical organizational chart modeled in ARIS of applicant. As can be seen, "Maria Lopez" has the role of a "Credit processing employee". The role "Credit processing employee" can occur in the departments "Credit processing department" and "Credit handling department". Both departments belong to the division "Credit Business division". Only organizational relations are modeled in this model.

FIG. 8b shows an EPC diagram as an example of a business process modeled in ARIS. In this process a function or task "Send welcome letter to customer" is executed by a role "Credit business employee".

It should be appreciated that ARIS is only one of a wide variety of modeling tools supported by certain example embodiments. More generally, modeling tools such as BPM (business process management) tools describe objects and relations between these objects in a graphical way. Objects may have a special semantic given by an object type and may have additional information such as a name or description, but they may also have numerical values or even information of other data types. Connections between objects also have a semantic given by a connection type and similar to objects they may also have additional information.

Objects and their relations to other objects are grouped in models. A model can be described as a container for the graphical representation. Different model types are used to deal with different purposes. For example, in UML a class diagram is used to define the attributes and the methods of classes. A BPMN process diagram is used to define a business process. Models can have, as objects and connections too, a type and may also have additional information.

In this context, meta models define which object types and which connection types between the different objects types are allowed. Furthermore the meta model defines which object types and connection types are allowed in a certain model type. Well known meta models are UML, BPMN or the ARIS meta model. A modeling tool typically itself has to take care that only allowed objects and connections are used.

Some of the conventional modeling tools have a file based approach to persist models, objects and relations. For each model a separate file is typically created, so that there is no connection between objects which occur in different models. In other words, the object nets which are described by the single models are not coupled. Other modeling tools use database systems to persist the objects, their relations and the models. In such tools the object nets described by the models are coupled. That is, one object can occur in more than one model and therefore it can be connected to objects in different models. In this case all the models together describe a complete object net. Models are only views onto a special part of this net, each with a special purpose, like a process model or an organizational diagram.

This approach of the state-of-the-art modeling tools describes only the direct connections between objects. On the logical level, however, also implicit relations can be found. FIG. 8c shows how the models shown in FIGS. 8a and 8b define an implicit relation between "Maria Lopez" and the task "Send welcome letter to customer". As this function is executed by the role "Credit processing employee" and Maria Lopez has the role of a "Credit processing employee" she can execute the function "Send welcome letter to customer". The relation between both objects, however, is not explicitly modeled.

To do evaluations or analyses on this logical level is very difficult. This is because the user of a modeling tool has to open models, find the right objects, check in which other models this object also occurs, open this model, and so on. Most modeling tools offer the possibility to check for occurrences. Nevertheless the user needs to execute a lot of steps and needs to have comprehensive knowledge of the underlying models to find the desired information.

For an automatic analysis, most modeling tools offer an API which allows implementing reports for the analysis. Typically, JavaScript, Visual Basic or Python is used as a programming language. Other tools also offer SQL or SQL-like interfaces to query the database. Some of them even offer a graphical UI to define queries. In this case the user can use an UI where he can see the database tables and connect them to query. The system itself then creates the SQL query.

Scripting languages like JavaScript, Visual Basic or Python are in general not usable for users that do not have extensive programming expertise. Also, defining SQL statements is typically too complex for such users, since they would have to know the database tables and how they are connected. Apart from that, when the database scheme has to be changed from one release to the next then it may well happen that the SQL queries no longer function properly. FIG. 8d illustrates a part of an exemplary report written in the programming language JavaScript.

In the following, it will be demonstrated how a query can be build with the query builder QB of certain example embodiments to find out in which processes (model type in ARIS is EPC in the above-described example) a person is involved.

After having selected the item type "Person" the query builder QB displays a list of all possible followers allowed in the meta model. That is, a "Person" can occupy a "Position" (cf. FIG. 9a). This "Position" can carry out "Functions" (cf. FIG. 9b), which represents the next follower in the query under construction. The "Function" which is carried out by the "Position" can occur in a process model, like "EPC" (cf. FIG. 9c), which represents the end of the query in this example.

Figure 9A:
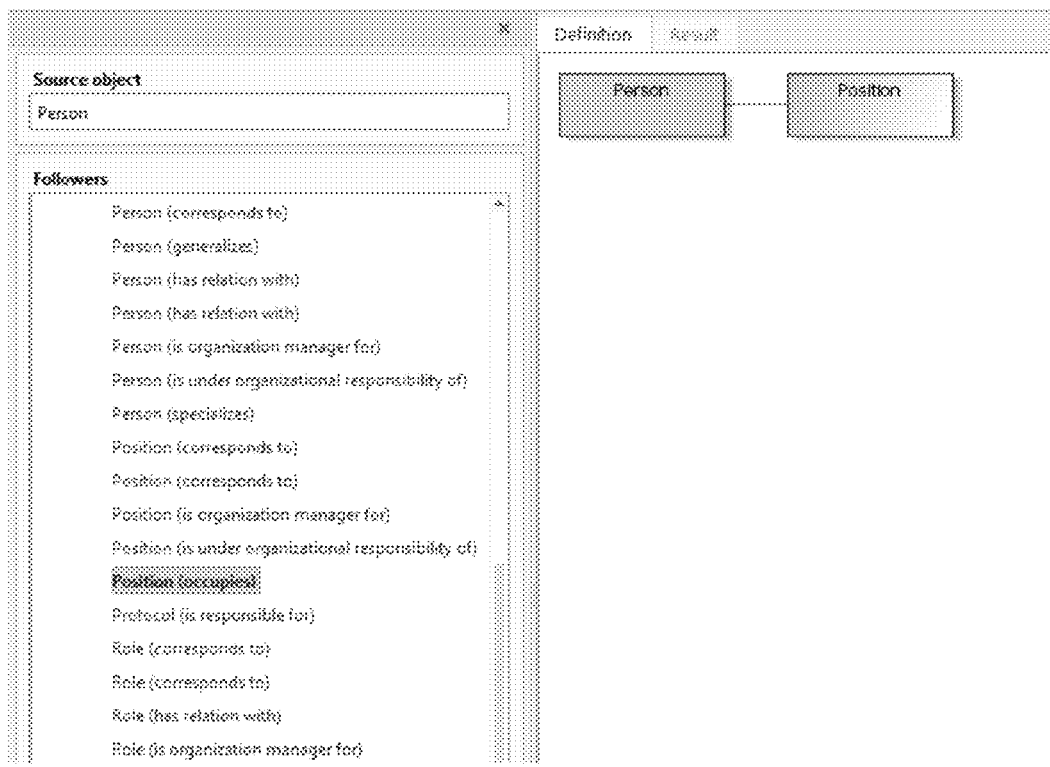
Figure 9B:
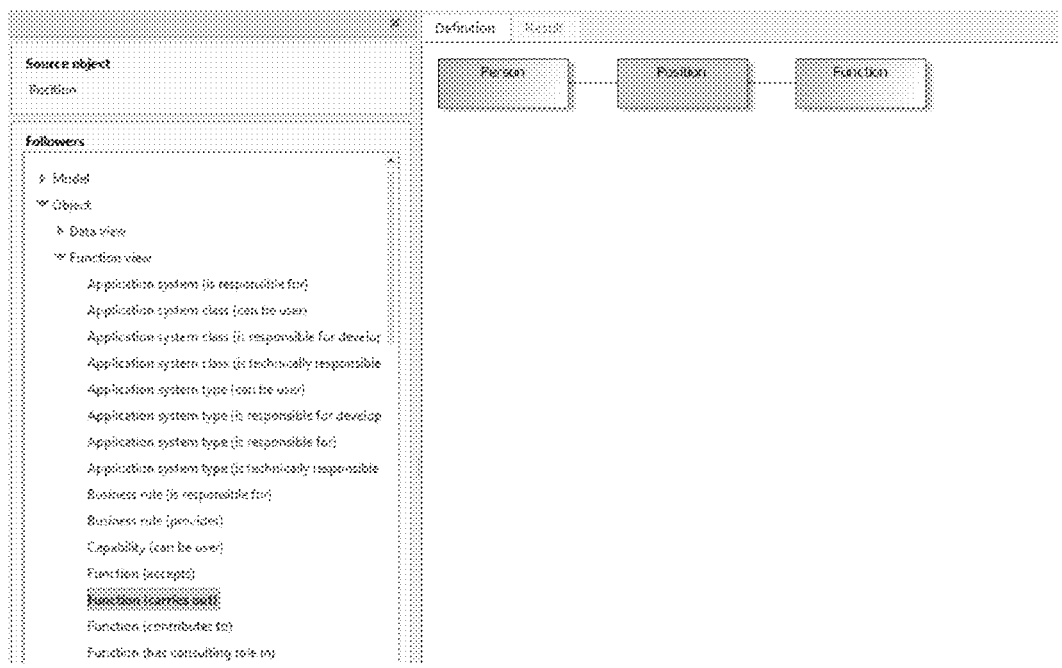
Figure 9C:
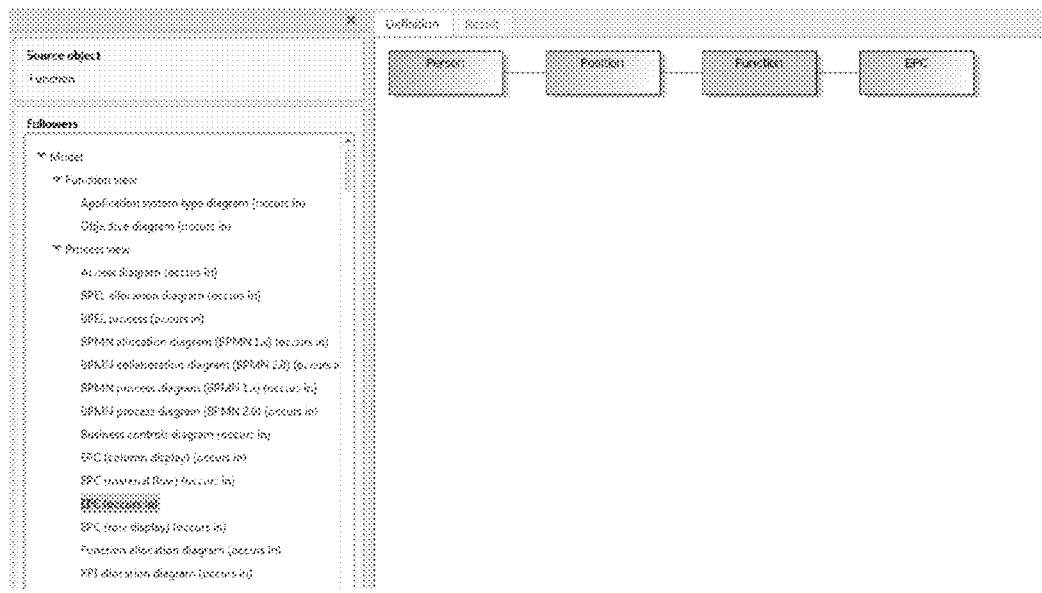
Figure 9D:
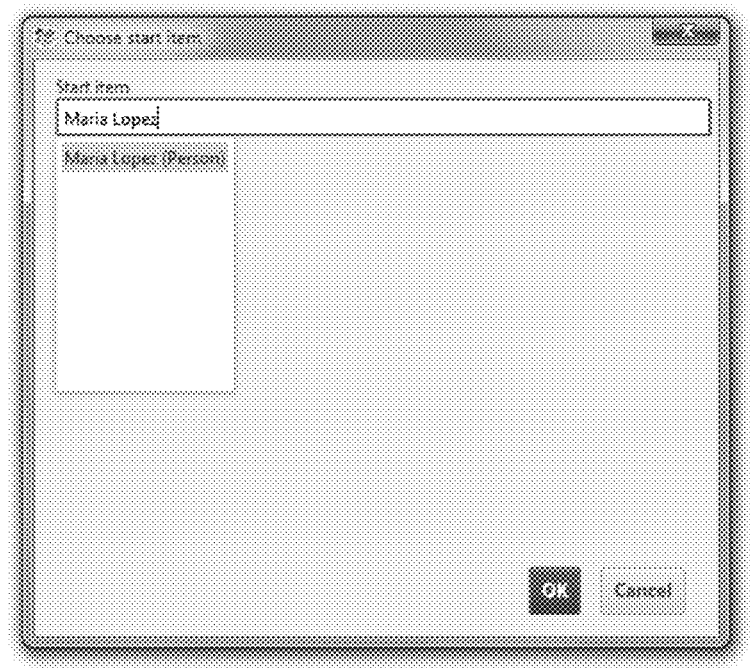
Figure 9E:
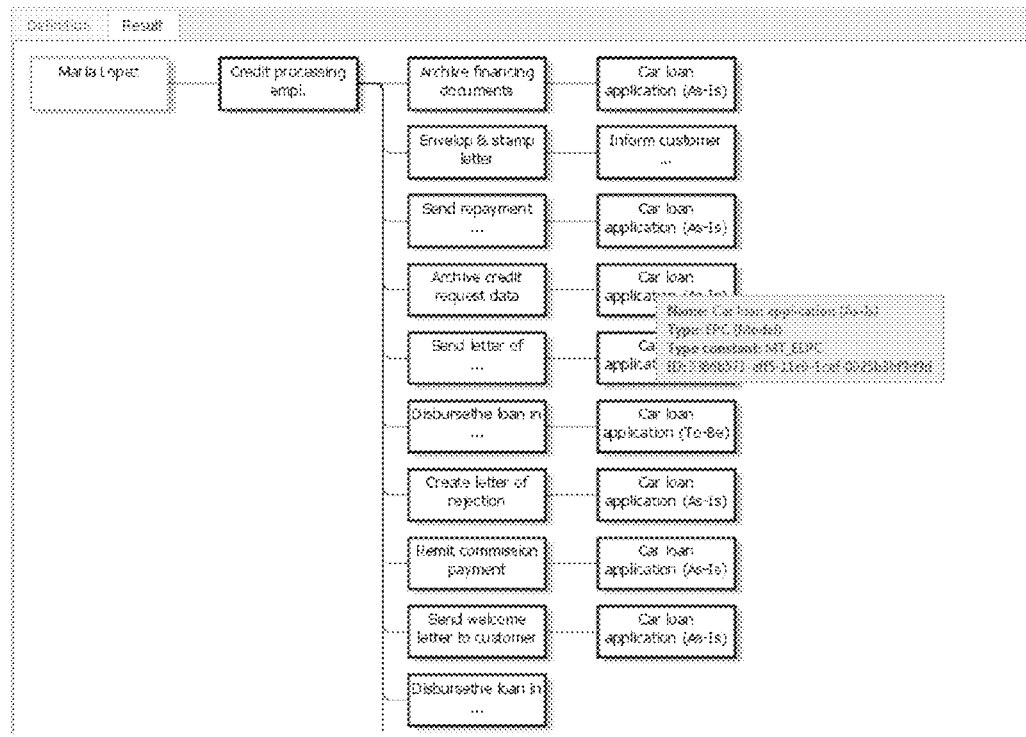

Starting the query on a concrete object of type "Person", such as "Maria Lopez" (cf. FIG. 9d) could lead to the following result net: "Maria Lopez" occupies the position of a "Credit processing employee". This position is carrying out functions like "Archive financing documents" or "Envelop & stamp letter". These objects occur in processes "Car loan application (As-Is)" and "Inform customer". This is illustrated in FIG. 9e.

Figure 9F:
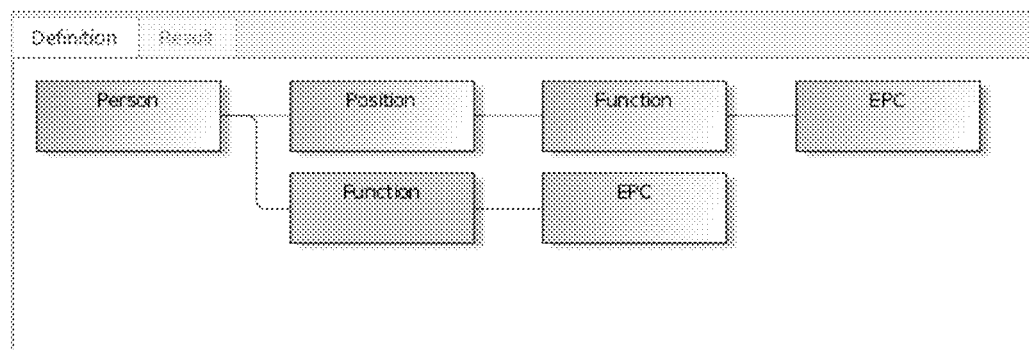

To handle situations in which an object of type "Person" is directly connected to a "Function", the query path may also be split into different sub paths, as exemplarily shown in FIG. 9f.

Connecting Different Data Sources in One Query

As already noted further above, a query may involve objects from more than one data source DS. For example, a customer may not only use ARIS as a modeling tool, but also ARIS PPM to measure the throughput time of process instances or to find out at which time on a day the process is mostly executed. ARIS PPM is internally using a different meta model and a different database. Therefore, ARIS PPM has to use its own adapter A, which translates the internal meta model into the common meta model MM.

By creating a query in the example above and combining this query with ARIS PPM, the user could simply combine the data to find out at which time a person should be in the office.

To combine two different data sources DS in the query builder QB, at least one of the adapters A has to know the other. This adapter A also has to specify how the mapping of the item types has to be done and also how concrete objects can be mapped.

In the scenario described above, the ARIS adapter knows the PPM adapter. EPCs in ARIS can have concrete instances in PPM. The ARIS adapter therefore defines that the item EPC corresponds to the item type EPC Instance in PPM.

To execute the query, also the mapping between a concrete model of type EPC and the concrete instances of the process in PPM must be specified. The process instances in PPM have an item information FID (Foreign ID) which contains the ID of the corresponding process model in ARIS.

The mapping is defined by:
(EPC==EPC Instance) and (EPC.ID==EPC Instance.FID)

Figure 9G:
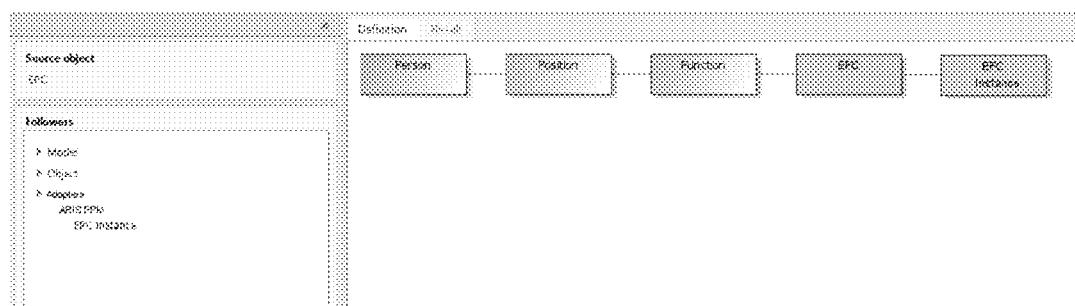

To switch from one adapter to another adapter, the query builder QB simply adds the mapping to the list of the followers, as exemplarily shown in FIG. 9g. After selecting a follower from another adapter, the user can simply extend the query within the corresponding data source.

Comparison of Certain Example Embodiments with Prior Art Approaches

Most competitors in the BPM market only provide scripting languages or SQL interfaces for analyses of graphical model data.

The article "Process Model Verification with SemQuu" of M. Feldmann et al. (available at http://subs.emis.de/LNI/Proceedings/Proceedings190/231.pdf) discloses a methodology called SemQuu. SPARQL queries are used to automate the check of semantics. The language is on a meta level to be able to use it for different modeling approaches. This article describes an approach to verify the semantical correctness of process models. Process models are transformed into ontology-based representations. The described system is based on SPARQL and OWL. Differences with certain example embodiments include without limitation:

SemQuu verifies the semantical correctness of process models. Certain example embodiments may be used to define special views onto the complete object net in the modeling tool and to do evaluations of transitive relations which are built over model boundaries.

SemQuu first exports the process models, transforms it to an OWL-DL ontology and then stores it in a repository. Certain example embodiments do not necessarily export any data from the used modeling tools, but operates directly on the model data in the respective data sources. All access is done in a synchronous way. The adapters of certain example embodiments may be responsible to access the data directly in the data source.

Support of multiple modeling languages. This requirement for SemQuu means that not only modeling languages like EPC are supported. Also BPMN and other process modeling languages should be supported. Certain example embodiments are not only focusing on business processes but also on all other model types like Organizational charts, data models, function allocation diagrams, or the like.

The UI of SemQuu is still very technical. The user is still confronted with the definition of SPARQL. SemQuu only supports the user to change or extend the created query e.g. by using auto-completion in the UI. An aspect of certain example embodiments relates to hiding all technical aspects normally needed for the formulation of queries. The user will only see objects and relations. The complete query is built as a graphical model. To model his query the user can use the same modeling tool as he uses to model to processes and all other models.

SemQuu does not have a common meta model for all data sources. Rather, SemQuu transforms all models directly into a technical language.

SemQuu does not allow collecting data (kpi) from the used data sources. Only process modeling tools are supported as data sources. A feature of certain example embodiments is to combine the object net defined in a process modeling tools with real data from other data sources such as SAP. The adapters are responsible to define the mapping between the different data sources.

—Even if SemQuu is not only focusing on one modeling language, such as EPC or BPMN, it seems that data from different data sources are not handled in one query. The data from each data source is transformed and then stored in the ontology based repository. The combination of data from the data sources is later on done on this repository. Certain example embodiments may provide a way to use more than one data source directly in the definition of a query. As already described, an adapter can define the mapping between objects in one data source and the other data source. Accordingly, the separation of the data sources is hidden for the user.

The article "Graphical Query Builder" (available at http://www.pgadmin.org/docs/dev/gqb.html) relates to the developer documentation of the PostgreSQL tools. The tool described in this article is a typical example of a graphical SQL query builder. The UI and the way how the query is modeled is the same in nearly all modelling tools:

Place an object
Place another object
Connect them by a connection

The problem compared to certain example embodiments is that the creator of such a query has to exactly know the database structure. He has to know by which data fields the tables in the data source are connected. In the example shown in the article, the user ha to know that "film" and "film category" are connected by the filed "film_id". Without this knowledge no query can be defined. Most or nearly all business users who model processes have no knowledge about database structures, indexes or keys. Such a tool supports the user only in writing SQL statements. But the technical details are not hidden at all.

Another disadvantage of this solution is that not all possible data sources offer a SQL interface to their data, since a SQL interface would allow the user to ignore user rights or would even allow to change data in the data source which could possibly lead to inconsistencies in the data.

Changes in the data base structure will lead to not working queries in the described SQL query builder. Such changes in the data base structures of a data source cannot be excluded between different released versions of the data source. In certain example embodiments, with each release of the data source a new adapter has to be released together with the data source. As long as the meta model of the data source will not be changed all queries in the system of certain example embodiments will continue working.

The article "Graphical query specification and dynamic result previews for a digital library" of Jones et al. (Department of Computer Science, University of Waikato) describes a system called VQuery to create Boolean queries in a graphical way. The system shall solve the problem that Boolean operations are used in very different ways in Boolean logic and in natural languages. Therefore, they use Venn-like diagrams instead of defining the searching expressions by text. This article is hardly related to certain example embodiments, since the teaching of the article does not concern BPM tools and even cannot be applied to BPM tools at all. Also, there is no abstraction layer for different data sources.

U.S. Pat. No. 6,609,123 describes a system to graphically design queries on more than one data source by building a common meta model above the meta model of the different data sources. The following differences with certain example embodiments can be seen:

Data Sources: The patent deals with tools for business intelligence. Data which are stored in different database systems should be connected and used for reporting. The term data source in this scenario exclusively refers to database systems such as Oracle, Sybase, DB2, SQL Server or the like. In certain example embodiments, a data source is not the used database itself, but an application system (which "under the hood" may use a data base system or even only a file system like Visio, ARIS Business Architect, ARIS Business Optimizer, SAP or even Microsoft Excel). Depending on the installation on the user's side, ARIS could even use different database systems. Most often used database systems in ARIS installations are Oracle or DB2.

Meta models: The term meta model of the data source in the above patent means the meta model of the database. As an example, there could be a table for Customer information inside the database. "Customer" is then one object of the used meta model. The meta model ARIS is using in the sense of the patent is quite different to what certain example embodiments understand as a meta model. The meta model ARIS is using on the database level is: Groups, Objdef—Definition of objects, ObjOcc—Occurence of an ObjDef in a model, CxnDef—Definition of a connection, CxnOcc—Occurrence of a CxnDef in a model, Model, . . . . Above this meta model, certain example embodiments provide a logic meta model MM—this model is called ARIS method and contains modeling paradigms like EPC, UML or BPMN.

Transformation: The above patent exports the so-called meta model of the data sources, transforms them and imports them to its own repository. On this repository the queries can be created. If the meta model of a data source will change, then this export and import have to be repeated. Certain example embodiments use only one very simple meta model. All transformations will result in the same meta model.

U.S. Pat. No. 7,383,513 defines a way how to define search criteria on a data source in a graphical way. This patent can be compared with the article described "Graphical Query Specification and Dynamic Result previews for a Digital Library" discussed above. The main focus also concerns how to model Boolean conditions, as Boolean expressions in Boolean logic and natural languages very often mean different things. The goal of the system is to reduce the number of found objects step by step by filter conditions. The conditions and the flow of the conditions can be organized in a graphical way. The goal of such a search query is to limit the number of objects of interest by each step. The system is used to define search criteria on tables in databases (col4, 40++). An example could be:

Give me all employees
Filter out all employees, younger than 40 years.
Filter out all female employees
Filter out all employees with a monthly salary of x€

In the example, all these filter steps are executed in the order as they have been written down. Certain example embodiments, on the contrary, operate on object nets. The goal is not to reduce the number of interesting objects in each step of query. In the first step, probably only one object will be obtained and with each step the number of results will grow. For Example:

Give me the possible roles for an employee in my company
Give me all processes in which these roles are involved
Give me all functions of these processes which can be executed by this role Certain example embodiments do not reduce the number of found objects by conditions, but defines a way how to navigate on an object net.

Another difference of the system described in the above patent and certain example embodiments concerns the result. The result of the system described by the patent will probably be a list of items for which all defined conditions are true. Certain example embodiments will create a net of objects. All objects in the resulting net will have a direct or indirect relation to the start object.

Another important difference is that the user of the described system will not work in the same environment for defining the query as he works for defining the models. Certain example embodiments describe a way how the user can model a query in the same way as he defines the data in the underlying data source(s).

Summary

In summary, certain example embodiments involve hiding all technical details behind a meta model MM (cf. FIG. 1) that is common to all connected data sources DS. To this end, a graphical query builder QB is provided which allows searching of a database (or other data source DS) in the same manner that models are designed. An abstraction mechanism generates a meta-model MM of the query (i.e. a data source independent format in which the query can be created), which can retrieve information from different data sources DS (by using RESTful adapters in the preferred implementation). To this end, adapters A are provided which translate the query formulated in the data source independent format into one or more queries in the format understood by the respective data source(s).

Importantly, the provided meta model MM is particularly simple to use, since it preferably only knows relations, items and item information as the elements common to all underlying data sources. By querying heterogeneous data sources DS through adapters and by producing a graphical model, which in turn is based on an abstracted meta-model of the underlying object types, the user does not require any knowledge of the stored structures in said heterogeneous data sources.

It will be appreciated that as used herein, the terms system, subsystem, service, engine, adapter, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

Glossary

| | |
|---|---|
| API | Application Programming Interface<br>Interface provided by an application to allow other applications to access the internal data or data structures. |
| BPMN | Business Process Model and Notation<br>A graphical modeling notation for business processes management. |
| BPM-Tools | Tools to do Business Process Management. This includes modeling of business processes, measuring or simulation of business processes and also documentation and publishing of them. |
| EPC | Event driven process chain<br>A graphical modeling notation for business processes. Developed in 1992 by Prof. Dr. Dr. mult. hc. August Wilhelm Scheer. One of the central parts of the ARIS methodology. |
| Java Script | Scripting oriented programming language<br>Mainly used for DOM-Scripting in Web browsers |
| KPI | Key Performance Indicator |
| OWL | Web Ontology Language, defined by the $W_3C$ to create ontologies based on a formal description language |
| Python | Programming Language |
| RACI | Responsible, Accountable, Consulted, Informed.<br>A technique for analyzing and presentation of responsibilities |
| RDF | Resource Description Framework, a standard defined by the $W_3C$ |
| SPARQL | A graph-based query language for RDF. Recursive acronym for: SPARQL protocol and RDF Query Language. |
| UI | User interface<br>In general that means the graphical User interface provided by an application for the user to control the application. |
| UML | Unified Modeling Language<br>A modeling language for the specification, construction and implementation of software. Developed by the Object Management Group (OMG) |
| URI | Uniform Resource Identifier, used as an identification for resources in internet |
| VisualBasic | Proprietary programming language developed by Microsoft |

What is claimed is:

1. A system for creating queries on model data of at least one data source in accordance with at least one data source specific format, wherein the system comprises:

processing resources including at least one processor and a memory;

a graphical query builder configured to enable a user to graphically define a query comprising a plurality of building blocks in accordance with a data source independent format; and a plurality of adapters configured to translate the graphically defined query in the data source independent format into at least one corresponding query in the data source specific format, the plurality of adapters including a first adapter for a first data source configured to translate a portion of the graphically defined query in the data source independent format into a corresponding partial query in the first data source specific format, and a second adapter for a second data source configured to translate another portion of the graphically defined query in the data source independent format into a corresponding partial query in the second data source specific format, wherein the first and second data sources are heterogeneous and at least one of the first and second adapters defines a mapping between objects in the first data source and the second data source.

2. The system of claim 1, wherein the graphical query builder is further configured to enable the user to select one or more building blocks for defining the query in the data source independent format, wherein each building block represents a query object or a query relation.

3. The system of claim 2, wherein the query relation is a relation between two query objects, a filter relation, and / or a user-defined relation.

4. The system of claim 1, wherein model data of the first data source represents graphical model data and model data of the second data source represents non-graphical model data.

5. The system of claim 1, wherein the system is configured for combining results of the partial queries.

6. The system of claim 1, wherein the graphical query builder is configured to enable the user to graphically define queries in an iterative manner.

7. The system of claim 1, wherein at least one of the adapters is a web service.

8. The system of claim 7, wherein the web service is a RESTful web service.

9. The system of claim 8, wherein the RESTful web service is configured for communicating with the graphical query builder using HTTP.

10. The system of claim 7, wherein the web service is configured for communicating with the graphical query builder using HTTP.

11. The system of claim 1, wherein the query in the data source independent format is a directed graph.

12. The system of claim 1, wherein each adapter is configured to implement a common API for providing access to the model data in the respective data source.

13. The system of claim 1, wherein the system is configured to store the query in the data source independent format on a storage medium; and wherein the system is configured to use stored queries for graphically defining a further query.

14. The system of claim 1, wherein at least one of the adapters is configured to access the at least one data source in accordance with an authorization and / or authentication mechanism.

15. The system of claim 1, wherein the data source independent format is built from a plurality of meta models of the data source(s).

16. The system of claim 1, wherein the data source independent format is a meta model that is common to a plurality of different data sources.

17. The system of claim 1, further comprising:

wherein the data source independent format is built from a meta model of the first data source and a meta model of the second data source, and the query in the data source independent format includes objects from the first data source and the second data source.

18. A method for creating queries on model data of at least one data source in accordance with at least one data source specific format, the method comprising:

a. graphically defining a query with a graphical query builder running on a computer, the query comprising a plurality of building blocks in accordance with a data source independent format; and b. translating, in connection with a plurality of adapters, the graphically defined query in the data source independent format into at least one corresponding query in the data source specific format, the translating comprising translating, in connection with a first adapter for a first data source, at least a portion of the graphically defined query into a corresponding partial query in the first data source specific format, and translating, in connection with a second adapter for a second data source, another portion of the graphically defined query into a corresponding partial query in the second data source specific format, wherein the first and second data sources are heterogeneous and at least one of the first and second adapters defines a mapping between objects in the first data source and the second data source.

19. The method of claim 18, wherein the query is graphically defined in an iterative manner.

20. The method of claim 18, wherein model data of the first data source represents graphical model data and model data of the second data source represents non-graphical model data.

21. A non-transitory computer readable storage medium tangibly storing a computer program comprising instructions for at least:

graphically defining a query with a graphical query builder running on a computer, the query comprising a plurality of building blocks in accordance with a data source independent format; and translating, in connection with a plurality of adapters the graphically defined query in the data source independent format into at least one corresponding query in the data source specific format, the translating comprising translating, in connection with a first adapter for a first data source, at least a portion of the graphically defined query into a corresponding partial query in the first data source specific format, and translating, in connection with a second adapter for a second data source, another portion of the graphically defined query into a corresponding partial query in the second data source specific format, wherein the first and second data sources are heterogeneous and at least one of the first and second adapters defines a mapping between objects in the first data source and the second data source.

* * * * *